United States Patent
Liu et al.

(10) Patent No.: US 10,911,107 B2
(45) Date of Patent: Feb. 2, 2021

(54) BEAM REFINEMENT METHOD AND COMMUNICATIONS DEVICE

(71) Applicant: Huawei Technologies Co., Ltd., Shenzhen (CN)

(72) Inventors: Jinnan Liu, Beijing (CN); Dejian Li, Beijing (CN); Yongping Zhang, Beijing (CN); Jiamin Chen, Beijing (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 0 days.

(21) Appl. No.: 16/182,215

(22) Filed: Nov. 6, 2018

(65) Prior Publication Data
US 2019/0074873 A1    Mar. 7, 2019

Related U.S. Application Data

(63) Continuation of application No. PCT/CN2016/081308, filed on May 6, 2016.

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0695* (2013.01); *H04B 7/10* (2013.01); *H04W 16/28* (2013.01); *H04W 40/06* (2013.01)

(58) Field of Classification Search
CPC ...... H04B 7/0417; H04B 7/0695; H04B 7/10; H04W 16/28; H04W 40/06
See application file for complete search history.

(56) References Cited

U.S. PATENT DOCUMENTS

| | | | |
|---|---|---|---|
| 8,335,167 B1 | 12/2012 | Zhang et al. | |
| 2006/0274852 A1* | 12/2006 | Trachewsky | H04L 1/0002 375/295 |

(Continued)

FOREIGN PATENT DOCUMENTS

| | | |
|---|---|---|
| CN | 103052085 | 4/2013 |
| CN | 103718591 | 4/2014 |

(Continued)

OTHER PUBLICATIONS

Intel, "IEEE P802.11 Wireless LANs, 11 ad PHY related Fixes," IEEE 802.11-14/1274r3, Sep. 16, 2014, 8 pages.

(Continued)

*Primary Examiner* — Sam K Ahn
*Assistant Examiner* — Amneet Singh
(74) *Attorney, Agent, or Firm* — Conley Rose, P.C.

(57) ABSTRACT

A beam refinement method and a communications device, where the method includes determining, by a first device, a format of an enhanced Beam Refinement Protocol (eBRP) packet, where the eBRP packet includes a training field, the training field includes an eBRP channel estimation (eBRP-CE) sub-field and an eBRP training (eBRP-TRN) sub-field, and a ratio of a quantity of Gray codes composing the eBRP-CE sub-field in the training field to a quantity of Gray codes composing the eBRP-TRN sub-field in the training field is less than 9:20, and sending, by the first device, the eBRP packet to a second device based on the determined format of the eBRP packet. Hence, an effective proportion of the eBRP-TRN sub-field in the training field can be increased such that more Antenna Weight Vector (AWV) configurations can be attempted within a same period of time.

20 Claims, 8 Drawing Sheets

(51) Int. Cl.
*H04W 40/06* (2009.01)
*H04W 16/28* (2009.01)
*H04B 7/10* (2017.01)

(56) References Cited

U.S. PATENT DOCUMENTS

| | | | |
|---|---|---|---|
| 2007/0205943 | A1 | 9/2007 | Nassiri-Toussi et al. |
| 2008/0204319 | A1 | 8/2008 | Niu et al. |
| 2011/0211490 | A1 | 9/2011 | Nikula et al. |
| 2013/0089000 | A1 | 4/2013 | Hansen et al. |
| 2013/0242968 | A1 | 9/2013 | Zhang et al. |
| 2016/0119046 | A1 | 4/2016 | Trainin et al. |
| 2016/0323755 | A1* | 11/2016 | Cordeiro ............. H04J 13/0014 |
| 2017/0033844 | A1* | 2/2017 | Kasher ................. H04B 7/0695 |
| 2017/0078008 | A1* | 3/2017 | Kasher ................. H04B 7/0617 |
| 2018/0301804 | A1 | 10/2018 | Gao et al. |

FOREIGN PATENT DOCUMENTS

| | | |
|---|---|---|
| JP | 2012501590 A | 1/2012 |
| WO | 2015198140 A1 | 12/2015 |

OTHER PUBLICATIONS

Foreign Communication From A Counterpart Application, PCT Application No. PCT/CN2016/081308, English Translation of International Search Report dated Jan. 24, 2017, 2 pages.
Foreign Communication From A Counterpart Application, PCT Application No. PCT/CN2016/081308, English Translation of Written Opinion dated Jan. 24, 2017, 4 pages.
Nitsche, T., et al., "IEEE 802.11ad: Directional 60 GHz Communication for Multi-Gigabit-per-Second Wi-Fi," XP011567636, IEEE Communications Magazine, vol. 52, No. 12, Dec. 2014, pp. 132-141.
Foreign Communication From A Counterpart Application, European Application No. 16900876.0, Extended European Search Report dated Jan. 22, 2019, 11 pages.
Kasher, A., (Intel), "Beamforming Training Update," IEEE 802.11-16/0103r0, IEEE, Jan. 2016, 16 pages.
Foreign Communication From A Counterpart Application, Japanese Application No. 2018-558172, Japanese Office Action dated Nov. 26, 2019, 4 pages.
Foreign Communication From A Counterpart Application, Japanese Application No. 2018-558172, English Translation of Japanese Office Action dated Nov. 26, 2019, 4 pages.
Li, D., "Proposed text improvements for CID 145 in CC12," IEEE 802.11-15/1407r0, Nov. 2015, pp. 1-9.
Doff, A.W., et al., "Sensor assisted movement identification and prediction forbeamformed 60 GHz links," 2015 12th Annual IEEE Consumer Communications and Networking Conference (CCNC). IEEE, Jan. 9, 2015, pp. 648-653.

\* cited by examiner

BEAM REFINEMENT METHOD AND COMMUNICATIONS DEVICE

CROSS-REFERENCE TO RELATED APPLICATIONS

This application is a continuation of International Patent Application No. PCT/CN2016/081308 filed on May 6, 2016, which is hereby incorporated by reference in its entirety.

TECHNICAL FIELD

Embodiments of the present disclosure relate to the field of communications technologies, and in particular, to a beam refinement method and a communications device.

BACKGROUND

Signal attenuation in a high frequency (particularly in a millimeter-wave band) is far greater than that in a low frequency (for example, a frequency lower than 6 gigahertz (GHz)). To resist the relatively high signal attenuation, a signal is usually sent in a beam form. When beam bandwidth is narrow enough, signal transmitting and signal receiving may achieve a specific communication distance and a specific transmission rate. However, when the beam bandwidth is excessively narrow, it is very difficult for a transmit end and a receive end to discover each other. When the beam bandwidth is excessively wide, an antenna gain is not high enough to obtain a desirable transmission rate.

To resolve the foregoing problem occurring in the millimeter-wave band, according to the Institute of Electrical and Electronics Engineers (IEEE) 802.11ad that operates in a frequency band of 60 GHz, beam training is performed in two phases to obtain beam information, sector level sweep (SLS) and Beam Refinement Protocol (also referred to as BRP). In the SLS phase, a terminal device (e.g., station (also referred to as STA)) is provided with beam information that is necessary for sending and receiving a signal i.e., a beam in this phase is relatively wide. The Beam Refinement Protocol allows a transmitter and a receiver to obtain beam refinement information after the SLS phase. According to the Beam Refinement Protocol, the transmitter transmits a Beam Refinement Protocol packet (BRP packet) to the receiver. The Beam Refinement Protocol packet includes a training field. The receiver determines the beam refinement information based on the training field.

Currently, the IEEE 802.11ay standard proposes, based on the IEEE 802.11ad, that a quantity of antenna weight vectors (AWVs) supported by each antenna be expanded (a quantity of AWVs supported by each antenna in the IEEE 802.11ad is not greater than 64) and a multiple-input and multiple-output (MIMO) technology be used. Therefore, more antennas are needed or more beams need to be trained. As a result, it is necessary to improve BRP packet efficiency.

SUMMARY

Embodiments of the present disclosure provide a beam refinement method and a communications device, to train more antennas or more beams within a same period of time based on a determined enhanced Beam Refinement Protocol packet.

According to a first aspect, an embodiment of the present disclosure provides a beam refinement method, where the method includes determining, by a first device, a format of an enhanced Beam Refinement Protocol (also referred to as eBRP) packet, where the eBRP packet includes a training field, the training field includes an eBRP channel estimation (also referred to as eBRP-CE) sub-field and an eBRP beam refinement training (also referred to as eBRP-TRN) sub-field, and a ratio of a quantity of Gray codes that compose the eBRP-CE sub-field in the training field to a quantity of Gray codes that compose the eBRP-TRN sub-field in the training field is less than 9:20, and sending, by the first device, the eBRP packet to a second device based on the determined format of the eBRP packet. In this way, an effective proportion of the eBRP-TRN sub-field in the training field is increased such that more AWV configurations can be attempted within a same period of time.

With reference to the first aspect, in a first possible implementation of the first aspect, the determining, by a first device, a format of an eBRP packet includes determining, by the first device, that a ratio of a quantity of eBRP-CE sub-fields in the training field to a quantity of eBRP-TRN sub-fields in the training field is less than or equal to 1:4, where when the ratio of the quantity of eBRP-CE sub-fields in the training field to the quantity of eBRP-TRN sub-fields in the training field is equal to 1:4, a ratio of a quantity of Gray codes that compose each eBRP-CE sub-field in the training field to a quantity of Gray codes that compose each eBRP-TRN sub-field in the training field is less than 9:5. In this way, the first device shortens a channel estimation (CE) length in the training field or reduces a proportion of a CE in the training field. Therefore, more beams can be trained and training efficiency is improved.

With reference to the first aspect, in a second possible implementation of the first aspect, determining, by a first device, a format of an eBRP packet includes determining, by the first device based on a modulation and coding scheme level of a data field, the ratio of the quantity of Gray codes that compose the eBRP-CE sub-field in the training field to the quantity of Gray codes that compose the eBRP-TRN sub-field in the training field.

With reference to the first aspect, in a third possible implementation of the first aspect, determining, by a first device, a format of an eBRP packet includes determining, by the first device, a transmission channel quantity C, and determining that each eBRP-CE sub-field in the training field is composed of C×S Gray codes, where S is a positive integer less than 9, and C is determined by the transmission channel quantity of the first device, determining, by the first device, a transmission channel quantity C, and determining that the eBRP-CE sub-field in the training field includes a first eBRP-CE sub-field and a second eBRP-CE sub-field, where each first eBRP-CE sub-field is composed of C×S Gray codes, and each second eBRP-CE sub-field is composed of nine Gray codes, S is a positive integer less than 9, and C is a positive integer greater than or equal to 1, or determining, by the first device, a transmission channel quantity C, and determining that each eBRP-CE sub-field in the training field is composed of C×9 Gray codes, and determining, by the first device, that a quantity N of eBRP-CE sub-fields in the training field, a quantity M of eBRP-TRN sub-fields in the training field, and a quantity Y of Gray codes that compose each eBRP-TRN sub-field in the training field meet the following formula 9×C×N:Y×M<9:20. In this way, the first device shortens a CE length in the training field. Therefore, more beams can be trained and training efficiency is improved.

With reference to the first aspect, in a fourth possible implementation of the first aspect, determining, by a first device, a format of an eBRP packet includes determining, by the first device, a transmission channel quantity C, and determining that each eBRP-TRN sub-field in the training field is composed of C×Y Gray codes, where Y is a positive integer greater than or equal to 5, C is a positive integer greater than or equal to 1, and when Y is a positive integer equal to 5, a quantity N of eBRP-CE sub-fields in the training field, a quantity X for each eBRP-CE sub-field in the training field, and a quantity M of eBRP-TRN sub-fields in the training field meet the following formula X×N:5×C× M<9:20. In this way, the first device extends a beam refinement training (TRN) length in the training field. Therefore, more beams can be trained and training efficiency is improved.

With reference to the first possible implementation of the first aspect, in a fifth possible implementation of the first aspect, determining, by a first device, a format of an eBRP packet includes determining, by the first device, that a length of each Gray code in each eBRP-CE sub-field and each eBRP-TRN sub-field in the training field is 128×$C_1$, when the ratio of the quantity of eBRP-CE sub-fields in the training field to the quantity of eBRP-TRN sub-fields in the training field is less than 1:4, determining, by the first device, that each eBRP-CE sub-field in the training field is composed of 9×$C_2$ Gray codes, and determining, by the first device, that each eBRP-TRN sub-field in the training field is composed of 5×$C_2$ Gray codes, when the ratio of the quantity of eBRP-CE sub-fields in the training field to the quantity of eBRP-TRN sub-fields in the training field is equal to 1:4, determining, by the first device, that each eBRP-CE sub-field in the training field is composed of 5×$C_2$ Gray codes, and determining, by the first device, that each eBRP-TRN sub-field in the training field is composed of 5×$C_2$ Gray codes, or when the ratio of the quantity of eBRP-CE sub-fields in the training field to the quantity of eBRP-TRN sub-fields in the training field is equal to 1:4, determining, by the first device, that the eBRP-CE sub-field in the training field includes a first eBRP-CE sub-field and a second eBRP-CE sub-field, where each first eBRP-CE sub-field is composed of 5×$C_2$ Gray codes, and each second eBRP-CE sub-field is composed of 9×$C_2$ Gray codes, and determining, by the first device, that each eBRP-TRN sub-field in the training field is composed of 5×$C_2$ Gray codes, where when $C_1$=1, $C_2$ is determined by a transmission channel quantity of the first device, or when $C_2$=1, $C_1$ is determined by a transmission channel quantity of the first device. When the ratio of the quantity of eBRP-CE sub-fields in the training field to the quantity of eBRP-TRN sub-fields in the training field is less than 1:4, formats of the eBRP-CE sub-fields are the same as a format of a CE sub-field in the IEEE 802.11ad, and formats of the eBRP-TRN sub-fields are the same as a format of a TRN sub-field in the IEEE 802.11ad. In this way, compatibility with the IEEE 802.11ad is maintained. When the ratio of the quantity of eBRP-CE sub-fields in the training field to the quantity of eBRP-TRN sub-fields in the training field is equal to 1:4, a length of all or some of the eBRP-CE sub-fields is less than a length of the CE sub-field in the IEEE 802.11ad. Therefore, the effective proportion of the eBRP-TRN sub-field in the training field can be increased.

With reference to the first aspect or the first possible implementation of the first aspect, in a sixth possible implementation of the first aspect, determining, by a first device, a format of an eBRP packet further includes, when an antenna quantity of the first device exceeds 1, determining, by the first device, that there is at least one pair of Gray code complementary sequences in each codeword of an orthogonal mask of the eBRP-CE sub-field and the eBRP-TRN sub-field. In this way, an orthogonal mask is used for eBRP-TRNs transmitted using different transmit antennas such that a plurality of antennas can be simultaneously trained and beam training efficiency is also improved.

With reference to the sixth possible implementation of the first aspect, in a seventh possible implementation of the first aspect, determining, by a first device, a format of an eBRP packet includes determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field.

With reference to the seventh possible implementation of the first aspect, in an eighth possible implementation of the first aspect, determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field includes, when the antenna quantity of the first device is 1 or 2 and an antenna of the first device is a co-polarized antenna, determining, by the first device, that each eBRP-CE sub-field in the training field is composed of 5×$C_2$ Gray codes, and determining that each eBRP-TRN sub-field in the training field is composed of five Gray codes, when the antenna quantity of the first device is 3 or 4 and an antenna of the first device is a co-polarized antenna, determining, by the first device, that each eBRP-CE sub-field in the training field is composed of 9×$C_2$ Gray codes, and determining, by the first device, that each eBRP-TRN sub-field in the training field is composed of 10×$C_2$ Gray codes or 9×$C_2$ Gray codes, or when the antenna quantity of the first device is 2 or 4 and an antenna of the first device is a cross-polarized antenna, determining, by the first device, that each eBRP-CE sub-field in the training field is composed of 5×$C_2$ Gray codes, and determining that each eBRP-TRN sub-field in the training field is composed of 5×$C_2$ Gray codes, where $C_2$=1 or $C_2$ is determined by a transmission channel quantity of the first device.

With reference to the eighth possible implementation of the first aspect, in a ninth possible implementation of the first aspect, determining, by a first device, a format of an eBRP packet further includes, when the antenna quantity of the first device is 1 or 2, determining, by the first device, that a length of each Gray code in each eBRP-CE sub-field and each eBRP-TRN sub-field in the training field is 128×$C_1$, when the antenna quantity of the first device is 3 or 4 and the eBRP-TRN sub-field in the training field is composed of 10×$C_2$ Gray codes, determining, by the first device, that a length of each Gray code in each eBRP-CE sub-field in the training field is 128×$C_1$, and determining that a length of each Gray code in each eBRP-TRN sub-field in the training field is 128×$C_1$ or 64×$C_1$, when the antenna quantity of the first device is 3 or 4 and the eBRP-TRN sub-field in the training field is composed of 9×$C_2$ Gray codes, determining, by the first device, that a length of each Gray code in each eBRP-CE sub-field and each eBRP-TRN sub-field in the training field is 128×$C_1$, or when the antenna quantity of the first device is 4 and the eBRP-TRN sub-field in the training field is composed of 5×$C_2$ Gray codes, determining, by the first device, that a length of each Gray code in each eBRP-CE sub-field and each eBRP-TRN sub-field in the training field is 128×$C_1$, where when $C_2$=1, $C_1$ is determined by the transmission channel quantity of the first device, or when $C_2$ is determined by the transmission channel quantity of the first device, $C_1$=1. In this way, when the antenna quantity is 1 or 2, time occupied by the eBRP-CE sub-field is less than time occupied by a CE sub-field in the IEEE 802.11ad standard. In this way, a ratio of the time occupied by the eBRP-CE sub-field in the training field to time occupied by the eBRP-TRN sub-field in the training field is reduced i.e., more eBRP-TRN sub-fields can be sent within a same period of time. Therefore, more beams can be trained and training efficiency is improved. When the antenna quantity is 3 or 4, a sequence length that is shorter than a TRN sub-field in the IEEE 802.11ad, that is, 128/2=64, is used for the eBRP-TRN. In addition, there is at least one pair of Gray code complementary sequences in each codeword of the orthogonal mask. In this way, training efficiency can be improved and precision of beam training measurement can be ensured.

With reference to any one of the first aspect or the possible implementations of the first aspect, in a tenth possible implementation of the first aspect, the training field further includes an eBRP beam refinement automatic gain control (eBRP-AGC) field, and determining, by a first device, a format of an eBRP packet further includes determining, by the first device, that the training field includes K AGC-TRN sub-field groups, where quantities of eBRP-AGC sub-fields and eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer. When K>1, a receiver may estimate a suitable receiver gain at each AGC-TRN sub-field group, and therefore a larger receiver dynamic range can be obtained. This helps to measure channel information in different AWV configurations. In addition, when the quantity K is the same as the quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

With reference to any one of the first aspect or the possible implementations of the first aspect, in an eleventh possible implementation of the first aspect, the method further includes sending, by the first device, training field configuration information to the second device, where the training field configuration information is used to indicate a format of the training field in the eBRP packet, and the training field configuration information is carried by one or more of a Beam Refinement Protocol request field, a beam refinement element, or a header field in the enhanced Beam Refinement Protocol packet. In this way, the first device can notify the second device of the format of the training field such that the second device performs beam training based on the format of the training field.

According to a second aspect, an embodiment of the present disclosure provides a beam refinement method, where the method includes determining, by a first device, a format of an eBRP packet, where the eBRP packet includes a training field, the training field is composed of an eBRP-AGC field and an eBRP beam refinement training eBRP-TRN sub-field, and sending, by the first device, the eBRP packet to a second device based on the determined format of the eBRP packet. In the foregoing technical solution, the training field does not include an eBRP-CE sub-field such that an effective proportion of the eBRP-TRN sub-field in the training field is increased, and more AWV configurations can be attempted within a same period of time.

With reference to the second aspect, in a first possible implementation of the second aspect, determining, by a first device, a format of an eBRP packet includes, when an antenna quantity of the first device is 1 or 2 and an antenna of the first device is a co-polarized antenna, determining, by the first device, that each eBRP-TRN sub-field in the training field is composed of $5 \times C_2$ Gray codes whose lengths are $128 \times C_1$, when an antenna quantity of the first device is 3 or 4 and an antenna of the first device is a co-polarized antenna, determining, by the first device, that each eBRP-TRN sub-field in the training field is in any one of the following formats $10 \times C_2$ Gray codes whose lengths are $64 \times C_1$ or $9 \times C_2$ Gray codes whose lengths are $128 \times C_1$, or when an antenna quantity of the first device is 2 or 4 and an antenna of the first device is a cross-polarized antenna, determining, by the first device, that each eBRP-TRN sub-field in the training field is composed of $5 \times C_2$ Gray codes whose lengths are $128 \times C_1$, where when $C_2=1$, $C_1$ is determined by a transmission channel quantity of the first device, or when $C_2$ is determined by a transmission channel quantity of the first device, $C_1=1$. In this way, when the antenna quantity is 1 or 2, time occupied by the eBRP-CE sub-field is less than time occupied by a CE sub-field in the IEEE 802.11ad standard. In this way, a ratio of the time occupied by the eBRP-CE sub-field in the training field to time occupied by the eBRP-TRN sub-field in the training field is reduced i.e., more eBRP-TRN sub-fields can be sent within a same period of time. Therefore, more beams can be trained and training efficiency is improved. When the antenna quantity is 3 or 4, a sequence length that is shorter than a TRN sub-field in the IEEE 802.11ad, that is, 128/2=64, can be used for the eBRP-TRN. In addition, there is at least one pair of Gray code complementary sequences in each codeword of an orthogonal mask. In this way, training efficiency can be improved and precision of beam training measurement can be ensured.

With reference to the second aspect or the first possible implementation of the second aspect, in a second possible implementation of the second aspect, determining, by a first device, a format of an eBRP packet includes determining, by the first device, that the training field includes K AGC-TRN sub-field groups, where quantities of eBRP-AGC sub-fields and eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than or equal to 1. When K>1, a receiver may estimate a suitable receiver gain at each AGC-TRN sub-field group, and therefore a larger receiver dynamic range can be obtained. This helps to measure channel information in different AWV configurations. In addition, when the quantity K is the same as the quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

With reference to the first possible implementation of the second aspect, in a third possible implementation of the second aspect, each of the K AGC-TRN sub-field groups includes one eBRP-AGC sub-field and one eBRP-TRN sub-field. In this way, AWV changing times can be reduced.

Reduction in the AWV changing times is accompanied with reduction in time that cannot be used for measurement in an AWV configuration. It is equivalent to a case in which an effective measurement time period for eBRP-TRN is extended. Therefore, more time may be available for determining magnitudes and phases corresponding to different AWV configurations, thereby helping to determine a refined beam.

With reference to the third possible implementation of the second aspect, in a fourth possible implementation of the second aspect, each eBRP-AGC sub-field is composed of T Gray codes whose lengths are $64 \times C_1$, where T is a positive integer greater than or equal to $5 \times C_2$ and less than or equal to $9 \times C_2$, or each eBRP-AGC sub-field is composed of $3 \times C_2$ or $4 \times C_2$ Gray codes whose lengths are $128 \times C_1$, where when $C_2=1$, $C_1$ is determined by the transmission channel quantity of the first device, or when $C_2$ is determined by the transmission channel quantity of the first device, $C_1=1$. In this way, the eBRP-AGC sub-field can be used to maintain time and frequency synchronization between a transmitter and a receiver.

With reference to any one of the second aspect or the possible implementations of the second aspect, in a fifth possible implementation of the second aspect, the method further includes sending, by the first device, training field configuration information to the second device, where the training field configuration information is used to indicate a format of the training field in the eBRP packet, and the training field configuration information is carried by any one or more of a Beam Refinement Protocol request field, a beam refinement element, or a header field in the enhanced Beam Refinement Protocol packet. In this way, the first device can notify the second device of the format of the training field such that the second device performs beam training based on the format of the training field.

According to a third aspect, an embodiment of the present disclosure provides a beam refinement method, where the method includes determining, by a first device, a format of an eBRP packet, where the eBRP packet includes a training field, the training field includes an eBRP-CE sub-field and an eBRP-TRN sub-field, and the determining, by a first device, a format of an enhanced Beam Refinement Protocol eBRP packet includes, when an antenna quantity of the first device exceeds 1, determining, by the first device, that there is at least one pair of Gray code complementary sequences in each codeword of an orthogonal mask of the eBRP-CE sub-field and the eBRP-TRN sub-field, and sending, by the first device, the eBRP packet to a second device based on the determined format of the eBRP packet. In this way, an orthogonal mask is used for eBRP-TRNs transmitted using different transmit antennas such that a plurality of antennas can be simultaneously trained and beam training efficiency is also improved.

With reference to the third aspect, in a first possible implementation of the third aspect, a ratio of a quantity of Gray codes that compose the eBRP-CE sub-field in the training field to a quantity of Gray codes that compose the eBRP-TRN sub-field in the training field is less than 9:20. In this way, an effective proportion of the eBRP-TRN sub-field in the training field is increased such that more AWV configurations can be attempted within a same period of time.

With reference to the first possible implementation of the third aspect, in a second possible implementation of the third aspect, determining, by a first device, a format of an eBRP packet includes determining, by the first device, that a ratio of a quantity of eBRP-CE sub-fields in the training field to a quantity of eBRP-TRN sub-fields in the training field is less than or equal to 1:4, where when the ratio of the quantity of eBRP-CE sub-fields in the training field to the quantity of eBRP-TRN sub-fields in the training field is equal to 1:4, a ratio of a quantity of Gray codes that compose each eBRP-CE sub-field in the training field to a quantity of Gray codes that compose each eBRP-TRN sub-field in the training field is less than 9:5. In this way, the first device shortens a CE length in the training field or reduces a proportion of a CE in the training field. Therefore, more beams can be trained and training efficiency is improved.

With reference to the first possible implementation of the third aspect, in a third possible implementation of the third aspect, determining, by a first device, a format of an eBRP packet includes determining, by the first device based on a modulation and coding scheme level of a data field, the ratio of the quantity of Gray codes that compose the eBRP-CE sub-field in the training field to the quantity of Gray codes that compose the eBRP-TRN sub-field in the training field.

With reference to the first possible implementation of the third aspect, in a fourth possible implementation of the third aspect, determining, by a first device, a format of an eBRP packet includes determining, by the first device, a transmission channel quantity C, and determining that each eBRP-CE sub-field in the training field is composed of $C \times S$ Gray codes, where S is a positive integer less than 9, and C is determined by the transmission channel quantity of the first device, determining, by the first device, a transmission channel quantity C, and determining that the eBRP-CE sub-field in the training field includes a first eBRP-CE sub-field and a second eBRP-CE sub-field, where each first eBRP-CE sub-field is composed of $C \times S$ Gray codes, and each second eBRP-CE sub-field is composed of nine Gray codes, S is a positive integer less than 9, and C is a positive integer greater than or equal to 1, or determining, by the first device, a transmission channel quantity C, and determining that each eBRP-CE sub-field in the training field is composed of $C \times 9$ Gray codes, and determining, by the first device, that a quantity N of eBRP-CE sub-fields in the training field, a quantity M of eBRP-TRN sub-fields in the training field, and a quantity Y of Gray codes that compose each eBRP-TRN sub-field in the training field meet the following formula $9 \times C \times N:Y \times M<9:20$. In this way, the first device shortens a CE length in the training field. Therefore, more beams can be trained and training efficiency is improved.

With reference to the first possible implementation of the third aspect, in a fifth possible implementation of the third aspect, determining, by a first device, a format of an eBRP packet includes determining, by the first device, a transmission channel quantity C, and determining that each eBRP-TRN sub-field in the training field is composed of $C \times Y$ Gray codes, where Y is a positive integer greater than or equal to 5, C is a positive integer greater than or equal to 1, and when Y is a positive integer equal to 5, a quantity N of eBRP-CE sub-fields in the training field, a quantity X for each eBRP-CE sub-field in the training field, and a quantity M of eBRP-TRN sub-fields in the training field meet the following formula $X \times N:5 \times C \times M<9:20$. In this way, the first device extends a TRN length in the training field. Therefore, more beams can be trained and training efficiency is improved.

With reference to the second possible implementation of the third aspect, in a sixth possible implementation of the third aspect, determining, by a first device, a format of an eBRP packet includes determining, by the first device, that a length of each Gray code in each eBRP-CE sub-field and each eBRP-TRN sub-field in the training field is $128 \times C_1$, when the ratio of the quantity of eBRP-CE sub-fields in the training field to the quantity of eBRP-TRN sub-fields in the training field is less than 1:4, determining, by the first device, that each eBRP-CE sub-field in the training field is composed of $9 \times C_2$ Gray codes, and determining, by the first device, that each eBRP-TRN sub-field in the training field is composed of $5 \times C_2$ Gray codes, when the ratio of the quantity of eBRP-CE sub-fields in the training field to the quantity of eBRP-TRN sub-fields in the training field is equal to 1:4, determining, by the first device, that each eBRP-CE sub-field in the training field is composed of $5 \times C_2$ Gray codes, and determining, by the first device, that each eBRP-TRN sub-field in the training field is composed of $5 \times C_2$ Gray codes, or when the ratio of the quantity of eBRP-CE sub-fields in the training field to the quantity of eBRP-TRN sub-fields in the training field is equal to 1:4, determining, by the first device, that the eBRP-CE sub-field in the training field includes a first eBRP-CE sub-field and a second eBRP-CE sub-field, where each first eBRP-CE sub-field is composed of $5 \times C_2$ Gray codes, and each second eBRP-CE sub-field is composed of $9 \times C_2$ Gray codes, and determining, by the first device, that each eBRP-TRN sub-field in the training field is composed of $5 \times C_2$ Gray codes, where when $C_1=1$, $C_2$ is determined by a transmission channel quantity of the first device, or when $C_2=1$, $C_1$ is determined by a transmission channel quantity of the first device. When the ratio of the quantity of eBRP-CE sub-fields in the training field to the quantity of eBRP-TRN sub-fields in the training field is less than 1:4, formats of the eBRP-CE sub-fields are the same as a format of a CE sub-field in the IEEE 802.11ad, and formats of the eBRP-TRN sub-fields are the same as a format of a TRN sub-field in the IEEE 802.11ad. In this way, compatibility with the IEEE 802.11ad is maintained. When the ratio of the quantity of eBRP-CE sub-fields in the training field to the quantity of eBRP-TRN sub-fields in the training field is equal to 1:4, a length of all or some of the eBRP-CE sub-fields is less than a length of the CE sub-field in the IEEE 802.11ad. Therefore, the effective proportion of the eBRP-TRN sub-field in the training field can be increased.

With reference to any one of the third aspect or the possible implementations of the third aspect, in a seventh possible implementation of the third aspect, determining, by a first device, a format of an eBRP packet includes determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field.

With reference to the seventh possible implementation of the third aspect, in an eighth possible implementation of the third aspect, determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field includes, when the antenna quantity of the first device is 1 or 2 and an antenna of the first device is a co-polarized antenna, determining, by the first device, that each eBRP-CE sub-field in the training field is composed of $5 \times C_2$ Gray codes, and determining that each eBRP-TRN sub-field in the training field is composed of five Gray codes, when the antenna quantity of the first device is 3 or 4 and an antenna of the first device is a co-polarized antenna, determining, by the first device, that each eBRP-CE sub-field in the training field is composed of $9 \times C_2$ Gray codes, and determining, by the first device, that each eBRP-TRN sub-field in the training field is composed of $10 \times C_2$ Gray codes or $9 \times C_2$ Gray codes, or when the antenna quantity of the first device is 2 or 4 and an antenna of the first device is a cross-polarized antenna, determining, by the first device, that each eBRP-CE sub-field in the training field is composed of $5 \times C_2$ Gray codes, and determining that each eBRP-TRN sub-field in the training field is composed of $5 \times C_2$ Gray codes, where $C_2=1$ or $C_2$ is determined by a transmission channel quantity of the first device.

With reference to the eighth possible implementation of the third aspect, in a ninth possible implementation of the third aspect, determining, by a first device, a format of an eBRP packet further includes, when the antenna quantity of the first device is 1 or 2, determining, by the first device, that a length of each Gray code in each eBRP-CE sub-field and each eBRP-TRN sub-field in the training field is $128 \times C_1$, when the antenna quantity of the first device is 3 or 4 and the eBRP-TRN sub-field in the training field is composed of $10 \times C_2$ Gray codes, determining, by the first device, that a length of each Gray code in each eBRP-CE sub-field in the training field is $128 \times C_1$, and determining that a length of each Gray code in each eBRP-TRN sub-field in the training field is $128 \times C_1$ or $64 \times C_1$, when the antenna quantity of the first device is 3 or 4 and the eBRP-TRN sub-field in the training field is composed of $9 \times C_2$ Gray codes, determining, by the first device, that a length of each Gray code in each eBRP-CE sub-field and each eBRP-TRN sub-field in the training field is $128 \times C_1$, or when the antenna quantity of the first device is 4 and the eBRP-TRN sub-field in the training field is composed of $5 \times C_2$ Gray codes, determining, by the first device, that a length of each Gray code in each eBRP-CE sub-field and each eBRP-TRN sub-field in the training field is $128 \times C_1$, where when $C_2=1$, $C_1$ is determined by the transmission channel quantity of the first device, or when $C_2$ is determined by the transmission channel quantity of the first device, $C_1=1$. In this way, when the antenna quantity is 1 or 2, time occupied by the eBRP-CE sub-field is less than time occupied by a CE sub-field in the IEEE 802.11ad standard. In this way, a ratio of the time occupied by the eBRP-CE sub-field in the training field to time occupied by the eBRP-TRN sub-field in the training field is reduced i.e., more eBRP-TRN sub-fields can be sent within a same period of time. Therefore, more beams can be trained and training efficiency is improved. When the antenna quantity is 3 or 4, a sequence length that is shorter than a TRN sub-field in the IEEE 802.11ad, that is, 128/2=64, is used for the eBRP-TRN. In addition, there is at least one pair of Gray code complementary sequences in each codeword of the orthogonal mask. In this way, training efficiency can be improved and precision of beam training measurement can be ensured.

With reference to any one of the third aspect or the possible implementations of the third aspect, in a tenth possible implementation of the third aspect, the training field further includes an eBRP-AGC field, and determining, by a first device, a format of an eBRP packet further includes determining, by the first device, that the training field includes K AGC-TRN sub-field groups, where quantities of eBRP-AGC sub-fields and eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer. When K>1, a receiver may estimate a suitable receiver gain at each AGC-TRN sub-field group, and therefore a larger receiver dynamic range can be obtained. This helps to measure channel information in different AWV configurations. In addition, when the quantity K is the same as the quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

With reference to any one of the third aspect or the possible implementations of the third aspect, in an eleventh possible implementation of the third aspect, the method further includes sending, by the first device, training field configuration information to the second device, where the training field configuration information is used to indicate a format of the training field in the eBRP packet, and the training field configuration information is carried by one or more of a Beam Refinement Protocol request field, a beam refinement element, or a header field in the enhanced Beam Refinement Protocol packet. In this way, the first device can notify the second device of the format of the training field such that the second device performs beam training based on the format of the training field.

According to a fourth aspect, an embodiment of the present disclosure provides a beam refinement method, where the method includes determining, by a first device, a format of an eBRP packet, where the eBRP packet includes a training field, and the training field includes an eBRP-AGC field, and determining, by a first device, a format of an eBRP packet includes determining, by the first device, that the training field includes K beam refinement automatic gain control-beam refinement training (AGC-TRN) sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1, and sending, by the first device, the eBRP packet to a second device based on the determined format of the eBRP packet. According to the foregoing technical solution, a receiver may estimate a suitable receiver gain at each AGC-TRN sub-field group, and therefore a larger receiver dynamic range can be obtained. This helps to measure channel information in different AWV configurations. In addition, when the quantity K is the same as the quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

With reference to the fourth aspect, in a first possible implementation of the fourth aspect, quantities of eBRP-AGC sub-fields included in any two of the K AGC-TRN sub-field groups are the same.

With reference to the fourth aspect or the first possible implementation of the fourth aspect, in a second possible implementation of the fourth aspect, a ratio of a quantity of Gray codes that compose the eBRP-CE sub-field in the training field to a quantity of Gray codes that compose the eBRP-TRN sub-field in the training field is less than 9:20, and the first device sends the eBRP packet to the second device based on the determined format of the eBRP packet. In this way, an effective proportion of the eBRP-TRN sub-field in the training field is increased such that more AWV configurations can be attempted within a same period of time.

With reference to the second possible implementation of the fourth aspect, in a third possible implementation of the fourth aspect, determining, by a first device, a format of an eBRP packet includes determining, by the first device, that a ratio of a quantity of eBRP-CE sub-fields in the training field to a quantity of eBRP-TRN sub-fields in the training field is less than or equal to 1:4, where when the ratio of the quantity of eBRP-CE sub-fields in the training field to the quantity of eBRP-TRN sub-fields in the training field is equal to 1:4, a ratio of a quantity of Gray codes that compose each eBRP-CE sub-field in the training field to a quantity of Gray codes that compose each eBRP-TRN sub-field in the training field is less than 9:5. In this way, the first device shortens a CE length in the training field or reduces a proportion of a CE in the training field. Therefore, more beams can be trained and training efficiency is improved.

With reference to the second possible implementation of the fourth aspect, in a fourth possible implementation of the fourth aspect, determining, by a first device, a format of an eBRP packet includes determining, by the first device based on a modulation and coding scheme level of a data field, the ratio of the quantity of Gray codes that compose the eBRP-CE sub-field in the training field to the quantity of Gray codes that compose the eBRP-TRN sub-field in the training field.

With reference to the second possible implementation of the fourth aspect, in a fifth possible implementation of the fourth aspect, determining, by a first device, a format of an eBRP packet includes determining, by the first device, a transmission channel quantity C, and determining that each eBRP-CE sub-field in the training field is composed of C×S Gray codes, where S is a positive integer less than 9, and C is determined by the transmission channel quantity of the first device, determining, by the first device, a transmission channel quantity C, and determining that the eBRP-CE sub-field in the training field includes a first eBRP-CE sub-field and a second eBRP-CE sub-field, where each first eBRP-CE sub-field is composed of C×S Gray codes, and each second eBRP-CE sub-field is composed of nine Gray codes, S is a positive integer less than 9, and C is a positive integer greater than or equal to 1, or determining, by the first device, a transmission channel quantity C, and determining that each eBRP-CE sub-field in the training field is composed of C×9 Gray codes, and determining, by the first device, that a quantity N of eBRP-CE sub-fields in the training field, a quantity M of eBRP-TRN sub-fields in the training field, and a quantity Y of Gray codes that compose each eBRP-TRN sub-field in the training field meet the following formula 9×C×N:Y×M<9:20. In this way, the first device shortens a CE length in the training field. Therefore, more beams can be trained and training efficiency is improved.

With reference to the second possible implementation of the fourth aspect, in a sixth possible implementation of the fourth aspect, determining, by a first device, a format of an eBRP packet includes determining, by the first device, a transmission channel quantity C, and determining that each eBRP-TRN sub-field in the training field is composed of C×Y Gray codes, where Y is a positive integer greater than or equal to 5, C is a positive integer greater than or equal to 1, and when Y is a positive integer equal to 5, a quantity N of eBRP-CE sub-fields in the training field, a quantity X for each eBRP-CE sub-field in the training field, and a quantity M of eBRP-TRN sub-fields in the training field meet the following formula X×N:5×C×M<9:20. In this way, the first device extends a TRN length in the training field. Therefore, more beams can be trained and training efficiency is improved.

With reference to the third possible implementation of the fourth aspect, in a seventh possible implementation of the fourth aspect, determining, by a first device, a format of an eBRP packet includes determining, by the first device, that a length of each Gray code in each eBRP-CE sub-field and each eBRP-TRN sub-field in the training field is 128×$C_1$, when the ratio of the quantity of eBRP-CE sub-fields in the training field to the quantity of eBRP-TRN sub-fields in the training field is less than 1:4, determining, by the first device, that each eBRP-CE sub-field in the training field is composed of 9×$C_2$ Gray codes, and determining, by the first device, that each eBRP-TRN sub-field in the training field is composed of 5×$C_2$ Gray codes, when the ratio of the quantity of eBRP-CE sub-fields in the training field to the quantity of eBRP-TRN sub-fields in the training field is equal to 1:4, determining, by the first device, that each eBRP-CE sub-field in the training field is composed of 5×$C_2$ Gray codes, and determining, by the first device, that each eBRP-TRN sub-field in the training field is composed of 5×$C_2$ Gray codes, or when the ratio of the quantity of eBRP-CE sub-fields in the training field to the quantity of eBRP-TRN sub-fields in the training field is equal to 1:4, determining, by the first device, that the eBRP-CE sub-field in the training field includes a first eBRP-CE sub-field and a second eBRP-CE sub-field, where each first eBRP-CE sub-field is composed of 5×$C_2$ Gray codes, and each second eBRP-CE sub-field is composed of 9×$C_2$ Gray codes, and determining, by the first device, that each eBRP-TRN sub-field in the training field is composed of 5×$C_2$ Gray codes, where when $C_1$=1, $C_2$ is determined by a transmission channel quantity of the first device, or when $C_2$=1, $C_1$ is determined by a transmission channel quantity of the first device. When the ratio of the quantity of eBRP-CE sub-fields in the training field to the quantity of eBRP-TRN sub-fields in the training field is less than 1:4, formats of the eBRP-CE sub-fields are the same as a format of a CE sub-field in the IEEE 802.11ad, and formats of the eBRP-TRN sub-fields are the same as a format of a TRN sub-field in the IEEE 802.11ad. In this way, compatibility with the IEEE 802.11ad is maintained. When the ratio of the quantity of eBRP-CE sub-fields in the training field to the quantity of eBRP-TRN sub-fields in the training field is equal to 1:4, a length of all or some of the eBRP-CE sub-fields is less than a length of the CE sub-field in the IEEE 802.11ad. Therefore, the effective proportion of the eBRP-TRN sub-field in the training field can be increased.

With reference to the second possible implementation of the fourth aspect or the third possible implementation of the fourth aspect, in an eighth possible implementation of the fourth aspect, determining, by a first device, a format of an eBRP packet further includes, when an antenna quantity of the first device exceeds 1, determining, by the first device, that there is at least one pair of Gray code complementary sequences in each codeword of an orthogonal mask of the eBRP-CE sub-field and the eBRP-TRN sub-field. In this way, an orthogonal mask is used for eBRP-TRNs transmitted using different transmit antennas such that a plurality of antennas can be simultaneously trained and beam training efficiency is also improved.

With reference to the eighth possible implementation of the fourth aspect, in a ninth possible implementation of the fourth aspect, determining, by a first device, a format of an eBRP packet includes determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field.

With reference to the ninth possible implementation of the fourth aspect, in a tenth possible implementation of the fourth aspect, determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field includes, when the antenna quantity of the first device is 1 or 2 and an antenna of the first device is a co-polarized antenna, determining, by the first device, that each eBRP-CE sub-field in the training field is composed of 5×$C_2$ Gray codes, and determining that each eBRP-TRN sub-field in the training field is composed of five Gray codes, when the antenna quantity of the first device is 3 or 4 and an antenna of the first device is a co-polarized antenna, determining, by the first device, that each eBRP-CE sub-field in the training field is composed of 9×$C_2$ Gray codes, and determining, by the first device, that each eBRP-TRN sub-field in the training field is composed of 10×$C_2$ Gray codes or 9×$C_2$ Gray codes, or when the antenna quantity of the first device is 2 or 4 and an antenna of the first device is a cross-polarized antenna, determining, by the first device, that each eBRP-CE sub-field in the training field is composed of 5×$C_2$ Gray codes, and determining that each eBRP-TRN sub-field in the training field is composed of 5×$C_2$ Gray codes, where $C_2$=1 or $C_2$ is determined by a transmission channel quantity of the first device.

With reference to the tenth possible implementation of the fourth aspect, in an eleventh possible implementation of the fourth aspect, determining, by a first device, a format of an eBRP packet further includes, when the antenna quantity of the first device is 1 or 2, determining, by the first device, that a length of each Gray code in each eBRP-CE sub-field and each eBRP-TRN sub-field in the training field is 128×$C_1$, when the antenna quantity of the first device is 3 or 4 and the eBRP-TRN sub-field in the training field is composed of 10×$C_2$ Gray codes, determining, by the first device, that a length of each Gray code in each eBRP-CE sub-field in the training field is 128×$C_1$, and determining that a length of each Gray code in each eBRP-TRN sub-field in the training field is 128×$C_1$ or 64×$C_1$, when the antenna quantity of the first device is 3 or 4 and the eBRP-TRN sub-field in the training field is composed of 9×$C_2$ Gray codes, determining, by the first device, that a length of each Gray code in each eBRP-CE sub-field and each eBRP-TRN sub-field in the training field is 128×$C_1$, or when the antenna quantity of the first device is 4 and the eBRP-TRN sub-field in the training field is composed of 5×$C_2$ Gray codes, determining, by the first device, that a length of each Gray code in each eBRP-CE sub-field and each eBRP-TRN sub-field in the training field is 128×$C_1$, where when $C_2$=1, $C_1$ is determined by the transmission channel quantity of the first device, or when $C_2$ is determined by the transmission channel quantity of the first device, $C_1$=1. In this way, when the antenna quantity is 1 or 2, time occupied by the eBRP-CE sub-field is less than time occupied by a CE sub-field in the IEEE 802.11ad standard. In this way, a ratio of the time occupied by the eBRP-CE sub-field in the training field to time occupied by the eBRP-TRN sub-field in the training field is reduced i.e., more eBRP-TRN sub-fields can be sent within a same period of time. Therefore, more beams can be trained and training efficiency is improved. When the antenna quantity is 3 or 4, a sequence length that is shorter than a TRN sub-field in the IEEE 802.11ad, that is, 128/2=64, is used for the eBRP-TRN. In addition, there is at least one pair of Gray code complementary sequences in each codeword of the orthogonal mask. In this way, training efficiency can be improved and precision of beam training measurement can be ensured.

With reference to any one of the fourth aspect or the possible implementations of the fourth aspect, in a twelfth possible implementation of the fourth aspect, the method further includes sending, by the first device, training field configuration information to the second device, where the training field configuration information is used to indicate a format of the training field in the eBRP packet, and the training field configuration information is carried by one or more of a Beam Refinement Protocol request field, a beam refinement element, or a header field in the enhanced Beam Refinement Protocol packet. In this way, the first device can notify the second device of the format of the training field such that the second device performs beam training based on the format of the training field.

According to a fifth aspect, an embodiment of the present disclosure provides a communications device, where the device includes units configured to perform the method according to the first aspect. The communications device is capable of performing steps of the method according to the first aspect. The communications device includes a determining unit and a communications unit. The determining unit is configured to determine a format of an eBRP packet, where the eBRP packet includes a training field, the training field includes an eBRP-CE sub-field and an eBRP-TRN sub-field, and a ratio of a quantity of Gray codes that compose the eBRP-CE sub-field in the training field to a quantity of Gray codes that compose the eBRP-TRN sub-field in the training field is less than 9:20. The communications unit is configured to send the eBRP packet to a second device based on the determined format of the eBRP packet.

According to a sixth aspect, an embodiment of the present disclosure provides a communications device, where the device includes units configured to perform the method according to the second aspect. The communications device is capable of performing steps of the method according to the second aspect. The communications device includes a determining unit and a communications unit. The determining unit is configured to determine a format of an eBRP packet, where the eBRP packet includes a training field, and the training field is composed of an eBRP-AGC field and an eBRP beam refinement training eBRP-TRN sub-field. The communications unit is configured to send the eBRP packet to a second device based on the determined format of the eBRP packet.

According to a seventh aspect, an embodiment of the present disclosure provides a communications device, where the device includes units configured to perform the method according to the third aspect. The communications device is capable of performing steps of the method according to the third aspect. The communications device includes a determining unit and a communications unit. The determining unit is configured to determine a format of an eBRP packet, where the eBRP packet includes a training field, the training field includes an eBRP-CE sub-field and an eBRP-TRN sub-field, and determining a format of an eBRP packet includes, when an antenna quantity of the communications device exceeds 1, determining that there is at least one pair of Gray code complementary sequences in each codeword of an orthogonal mask of the eBRP-CE sub-field and the eBRP-TRN sub-field. The communications unit is configured to send the eBRP packet to a second device based on the determined format of the eBRP packet.

According to an eighth aspect, an embodiment of the present disclosure provides a communications device, where the device includes units configured to perform the method according to the fourth aspect. The communications device is capable of performing steps of the method according to the fourth aspect. The communications device includes a determining unit and a communications unit. The determining unit is configured to determine a format of an eBRP packet, where the eBRP packet includes a training field, the training field includes an eBRP-AGC field, and determining a format of an eBRP packet includes determining that the training field includes K beam refinement AGC-TRN sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1. The communications unit is configured to send the eBRP packet to a second device based on the determined format of the eBRP packet.

According to a ninth aspect, an embodiment of the present disclosure provides a computer readable storage medium, where a program stored in the computer readable storage medium includes an instruction used to perform the method according to the first aspect.

According to a tenth aspect, an embodiment of the present disclosure provides a computer readable storage medium, where a program stored in the computer readable storage medium includes an instruction used to perform the method according to the second aspect.

According to an eleventh aspect, an embodiment of the present disclosure provides a computer readable storage medium, where a program stored in the computer readable storage medium includes an instruction used to perform the method according to the third aspect.

According to a twelfth aspect, an embodiment of the present disclosure provides a computer readable storage medium, where a program stored in the computer readable storage medium includes an instruction used to perform the method according to the fourth aspect.

According to a thirteenth aspect, an embodiment of the present disclosure provides a communications device, where the device includes the computer readable storage medium according to the ninth aspect and a processor. The processor is configured to execute an instruction of a program stored in the computer readable storage medium. The program includes an instruction used to execute the following operations determining a format of an eBRP packet, where the eBRP packet includes a training field, the training field includes an eBRP-CE sub-field and an eBRP-TRN sub-field, and a ratio of a quantity of Gray codes that compose the eBRP-CE sub-field in the training field to a quantity of Gray codes that compose the eBRP-TRN sub-field in the training field is less than 9:20, and sending the eBRP packet to a second device based on the determined format of the eBRP packet.

According to a fourteenth aspect, an embodiment of the present disclosure provides a communications device, where the device includes the computer readable storage medium according to the tenth aspect and a processor. The processor is configured to execute an instruction of a program stored in the computer readable storage medium. The program includes an instruction used to execute the following operations of determining a format of an eBRP packet, where the eBRP packet includes a training field, the training field is composed of an eBRP-AGC field and an eBRP beam refinement training eBRP-TRN sub-field, and sending the eBRP packet to a second device based on the determined format of the eBRP packet.

According to a fifteenth aspect, an embodiment of the present disclosure provides a communications device, where the device includes the computer readable storage medium according to the eleventh aspect and a processor. The processor is configured to execute an instruction of a program stored in the computer readable storage medium. The program includes an instruction used to execute the following operations of determining a format of an eBRP packet, where the eBRP packet includes a training field, the training field includes an eBRP-CE sub-field and an eBRP-TRN sub-field, and the determining a format of an eBRP packet includes, when an antenna quantity of the communications device exceeds 1, determining that there is at least one pair of Gray code complementary sequences in each codeword of an orthogonal mask of the eBRP-CE sub-field and the eBRP-TRN sub-field, and sending the eBRP packet to a second device based on the determined format of the eBRP packet.

According to a sixteenth aspect, an embodiment of the present disclosure provides a communications device, where the device includes the computer readable storage medium according to the twelfth aspect and a processor. The processor is configured to execute an instruction of a program stored in the computer readable storage medium. The program includes an instruction used to execute the following operations of determining a format of an eBRP packet, where the eBRP packet includes a training field, the training field includes an eBRP-AGC field, and determining a format of an enhanced Beam Refinement Protocol eBRP packet includes determining that the training field includes K beam refinement AGC-TRN sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1, and sending the eBRP packet to a second device based on the determined format of the eBRP packet.

BRIEF DESCRIPTION OF DRAWINGS

To describe the technical solutions in some of the embodiments of the present disclosure more clearly, the following briefly describes the accompanying drawings describing some of the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
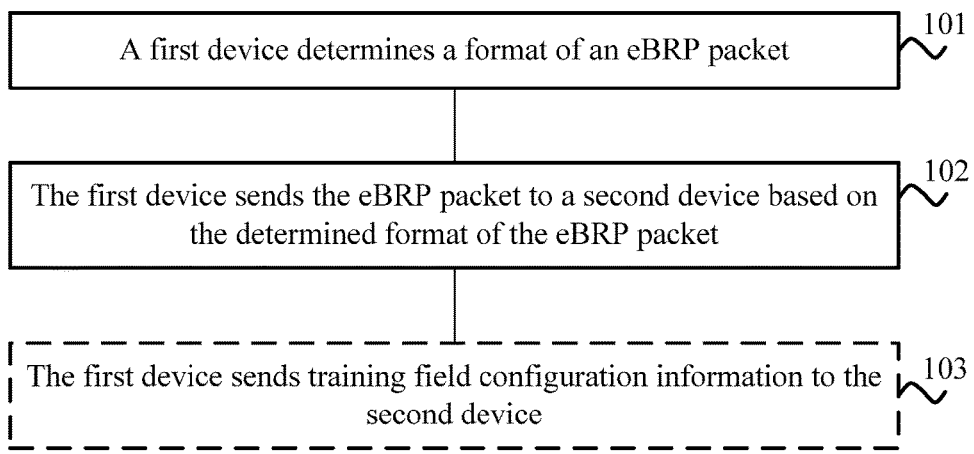
FIG. 1 is a schematic flowchart of a beam refinement method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A first device, a second device, and a communications device that are referred to in the embodiments of the present disclosure may be access points (APs) or may be STAs.

A Beam Refinement Protocol packet in the IEEE 802.11ad (which may also be referred to as a standard about directional multi-gigabit (DMG) includes a preamble field, a header field, a data field, and a training field. The preamble field includes a short training field (STF) and a CE field. A receiver may use the STF to obtain packet synchronization and automatic gain adjustment, and use the CE field to perform channel estimation and data demodulation. A channel estimated using the CE field is a wireless channel, between the receiver and a transmitter configured using an antenna array and used for corresponding transmission data. The header field includes a plurality of fields, and the plurality of fields are used to describe a transmission mode of the data field and to indicate a length of a suffix training field and suffix type information of the data. When the length of the training field is N, a length that can be used to receive and transmit beam AWV configurations and that is in the training field is 4N. The type information indicates whether the packet is used for receive-beam training or transmit-beam training, which may be understood as, when a BRP packet is received or transmitted, whether the receiver performs receive-beam training by changing an AWV or the transmitter performs transmit-beam training by changing an AWV. The training field includes a beam refinement automatic gain control field (also referred to as AGC field) and a beam refinement training field (also referred to as TRN field). The TRN field is composed of one or more TRN units, and each TRN unit is composed of one CE sub-field and four TRN sub-fields. A same format is used for the CE sub-field in the training field and a CE field in the preamble. The CE in the preamble is designed for correctly demodulating a header and data when a signal-to-noise ratio for a link is the worst. The receiver determines, by measuring a signal in the TRN sub-fields, information about a wireless channel that is between the receiver and the transmitter and that is in a corresponding receive AWV or transmit AWV configuration, and a receive beam or a transmit beam is refined based on the measured information about the wireless channel. However, when the receiver or the transmitter changes an AWV, a relatively large change actually occurs on the wireless channel between the receiver and the transmitter. Therefore, the AGC field is added to the front of the beam training field in order to allow the receiver to obtain a suitable AGC gain. In addition, one CE sub-field is inserted prior to four TRN units in order to maintain time and frequency synchronization between the receiver and the transmitter, and measure a common delay parameter on different AWVs.

FIG. 1 is a schematic flowchart of a beam refinement method according to an embodiment of the present disclosure.

Step 101. A first device determines a format of an eBRP packet, where the eBRP packet includes a training field, the training field includes an eBRP-CE sub-field and an eBRP-TRN sub-field, and a ratio of a quantity of Gray codes of the eBRP-CE sub-field in the training field to a quantity of Gray codes of the eBRP-TRN sub-field in the training field is less than 9:20.

It can be understood that, the eBRP packet referred to in this specification of the present disclosure is intended to be differentiated from a BRP packet prescribed in the IEEE 802.11ad standard in other approaches. The eBRP packet includes the training field that has the foregoing characteristics. In addition, TRN, CE, and AGC in the eBRP packet are referred to as eBRP-TRN, eBRP-CE, and eBRP-AGC respectively in this specification of the present disclosure in order to be differentiated from TRN, CE, and AGC that are prescribed in the IEEE 802.11ad standard. It can be understood that the foregoing terms are merely for ease of differentiation but not for limiting the present disclosure. Certainly, a BRP packet and a training field that have the foregoing characteristics may also be referred to as other names, and are not limited to being referred to as the name of eBRP packet.

The training field is a suffix after the data field, and in addition to the training field and the data field, the eBRP packet may further include a preamble field and a header field. Formats of the preamble field, the header field, and the data field of the eBRP packet may be in compliance with formats that have been defined in the IEEE 802.11ad, or may be in compliance with new formats defined in a subsequent standard (for example, the IEEE 802.11ay). For example, a new short training sequence field that is used for channel bonding or MIMO channel estimation, a new channel estimation field, and a new header that is used to indicate a new data transmission mode are added prior to the data field. Formats of fields prior to the data are not emphases of the present disclosure, and therefore are not particularly limited.

Figure 2:
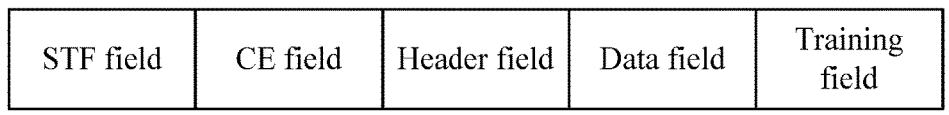
FIG. 2 is a schematic diagram of a format of an eBRP packet.

FIG. 2 is a schematic diagram of a format of an eBRP packet. As shown in FIG. 2, the eBRP packet successively includes an STF field, a CE field, a header field, a data field, and a training field.

Figure 3:
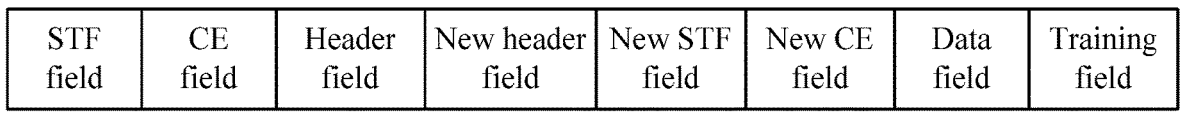
FIG. 3 is a schematic diagram of another format of an eBRP packet.

FIG. 3 is a schematic diagram of another format of an eBRP packet. As shown in FIG. 3, the eBRP packet successively includes an STF field, a CE field, a header field, a new header field, a new STF field, a new CE field, a data field, and a training field.

Step 102. The first device sends the eBRP packet to a second device based on the determined format of the eBRP packet.

It can be understood that, in the training field, a quantity of AWVs trained by the first device or the second device is related to a quantity of eBRP-TRN sub-fields but is not related to a quantity of eBRP-CE sub-fields. According to the method shown in FIG. 1, an effective proportion of the eBRP-TRN sub-field in the training field is increased such that more AWV configurations can be attempted within a same period of time.

It can be understood that, the quantity of Gray codes that compose the eBRP-CE sub-field in the training field is related to the quantity of eBRP-CE sub-fields in the training field and a quantity of Gray codes of each eBRP-CE sub-field in the training field. Further, assuming that the quantity of eBRP-CE sub-fields in the training field is N and each eBRP-CE sub-field in the training field is composed of X Gray codes, the quantity of Gray codes that compose the eBRP-CE sub-field in the training field is X×N. Similarly, the quantity of Gray codes that compose the eBRP-TRN sub-field in the training field is related to the quantity of eBRP-TRN sub-fields in the training field and a quantity of Gray codes of each eBRP-TRN sub-field in the training field. Assuming that the quantity of eBRP-TRN sub-fields in the training field is M and each eBRP-TRN sub-field in the training field is composed of Y Gray codes, the quantity of Gray codes that compose the eBRP-TRN sub-field in the training field is Y×M. In this case, the ratio of the quantity of Gray codes that compose the eBRP-CE sub-field in the training field to the quantity of Gray codes that compose the eBRP-TRN sub-field in the training field meets the following formula X×N:Y×M<9:20 (Formula 1.1).

In the IEEE 802.11ad, a CE field in a training field has a same design and length as a CE field in a preamble field. According to the design of the CE field in the preamble field, a header and data can still be correctly demodulated even when a signal-to-noise ratio (SNR) for a link is the worst (for example, an SNR corresponding to a link MCS0 in a control mode is −13 decibels (dB)). However, for the CE sub-field in the training field, in order to maintain time and frequency synchronization between a receiver and a transmitter and measure a common delay parameter on different AWVs, a CE length in the training field may be properly shortened based on a design requirement to obtain an effect of improving beam training efficiency. For example, a status of the signal-to-noise ratio may be mapped according to a modulation and coding scheme (also referred to as MCS) used for data in the eBRP packet to determine a to-be-shortened CE length in the training field. For example, in the IEEE 802.1 lad, except that the SNR corresponding to the MCS0 is extremely low, an SNR corresponding to another MCS level is far greater than −13 dB. For example, a lowest MCS level after the MCS0 is MCS1, and an SNR corresponding to the MCS1 is −1 dB. When data is not transmitted using the MCS0, any channel transmitted at another MCS level can support shortening of the CE length in the training field.

In addition, in the IEEE 802.11ad, the CE field in the preamble field maintains the time and frequency synchronization between the receiver and the transmitter, besides, a pilot or a guard interval is added to the data field to provide phase noise tracking during data receiving. Therefore, even in data demodulation, overheads used to maintain the time and frequency synchronization between the receiver and the transmitter are far less than overheads of the CE in the training field. Therefore, a possible solution is using a known sequence in a TRN sub-field to perform phase noise tracking in addition to using the CE in the training field to maintain the time and frequency synchronization between the receiver and the transmitter in order to obtain an effect of improving beam training efficiency. Based on the foregoing reason, a proportion of the CE in the training field can be reduced.

Therefore, the present disclosure separately provides, in a case of a single channel and a case of multi-channel bonding, a method for improving beam training efficiency by reducing the CE length in the training field and the proportion of the CE in the training field.

Optionally, in an embodiment, a ratio of a quantity of eBRP-CE sub-fields in the training field to a quantity of eBRP-TRN sub-fields in the training field is less than or equal to 1:4. For example, the first device may directly determine the quantity of eBRP-CE sub-fields in the training field and the quantity of eBRP-TRN sub-fields in the training field. The ratio of the quantity of eBRP-CE sub-fields to the quantity of eBRP-TRN sub-fields is less than or equal to 1:4. For another example, the first device may first determine the ratio of the quantity of eBRP-CE sub-fields in the training field to the quantity of eBRP-TRN sub-fields in the training field, and then determine the quantity of eBRP-CE sub-fields and the quantity of eBRP-TRN sub-fields based on the determined ratio. In addition, the ratio of the quantity of eBRP-CE sub-fields in the training field to the quantity of eBRP-TRN sub-fields in the training field may be 1:n, where n is a positive integer greater than or equal to 5. Further, n may be a positive multiple of 4, for example, n may be equal to 8, 12, or the like.

Further, if the ratio of N:M is less than 1:4, the ratio of X:Y may be determined based on the ratio of N:M such that X×N:Y×M meets Formula 1.1. If the ratio of N:M is equal to 1:4, a condition for meeting Formula 1.1 is that the ratio of X:Y is less than 9:5. If the ratio of X:Y is less than 9:5, Formula 1.1 is met regardless of whether the ratio of N:M is less than 1:4 or equal to 1:4. For example, if the ratio of N:M is less than 1:4, the first device determines that each eBRP-CE sub-field in the training field is composed of nine Gray codes, and determines that each eBRP-TRN sub-field in the training field is composed of five Gray codes.

Optionally, in another embodiment, the first device may determine, based on an MCS level of the data field, the ratio of the quantity of Gray codes that compose the eBRP-CE sub-field in the training field to the quantity of Gray codes that compose the eBRP-TRN sub-field in the training field.

Further, the MCS level of the data field corresponds to a signal-to-noise ratio of a current data channel. Based on an SNR and a length of a given CE (herein, the CE length includes a quantity and lengths of Gray codes in the CE), a residual carrier frequency offset (RCFO) may be obtained through simulation. Based on the SNR and the RCFO, a ratio of the quantity of eBRP-TRN sub-fields in the training field relative to the given CE sub-field may be finally determined such that the ratio of the quantity of Gray codes that compose the eBRP-CE sub-field in the training field to the quantity of Gray codes that compose the eBRP-TRN sub-field in the training field can be determined.

For example, when the SNR is −10 dB, it may be determined that 90% of RCFO estimation values are below 8.359 parts per million (ppm) when nine Gray codes whose lengths are 128 are used to perform carrier frequency offset (CFO) estimation, and it may be determined that 90% of RCFO estimation values are below 18 ppm when five Gray codes whose lengths are 128 are used to perform CFO estimation. For another example, when the SNR is −1 dB, it may be determined that 90% of RCFOs are below 1.2 ppm when nine Gray codes whose lengths are 128 are used to perform CFO estimation, and it may be determined that 90% of RCFO estimation values are below 2.719 ppm when five Gray codes whose lengths are 128 are used to perform CFO estimation.

After the RCFO is determined, the ratio of the quantity of eBRP-CE sub-fields in the training field to the quantity of eBRP-TRN sub-fields in the training field may be determined using the RCFO. Further, a spectrum causes phase rotation exp (j×π×CFO×t), and a phase is periodic, that is, exp (j×2π×CFO×t1)=exp (j×2π×CFO×1+2kπ). Therefore, k may be equal to a nonzero integer, such as +/−1, +/−2, or the like. CFO=fc×$\Delta_{ppm}$×1e−6, where fc is a carrier frequency, and $\Delta_{ppm}$ is a frequency offset value represented by one part per million of the carrier frequency. In 60 GHz, center frequencies of four channels may be selected, for example, a center frequency of 58.320 GHz is selected. 1/Fc=0.57 nanoseconds (ns) is selected as an interval of sampling points. Therefore, a quantity of sampling points corresponding to a period is Fc/(fc×$\Delta_{ppm}$×1e−6). Because the quantity of sampling points is an integer, rounding down is used herein, to obtain the following relationship. When the RCFO=40 ppm, (length_CE+M×length_TRN)<754, and when length_CE=1152 and length_TRN=640, there is no suitable value for M. Herein, length_CE represents a length of the eBRP-CE sub-field (that is, representing a quantity of sampling points included in the field), and length_TRN represents a length of the eBRP-TRN sub-field (that is, representing a quantity of sampling points included in the field). For another example, when RCFO=8 ppm, (length_CE+M×length_TRN)<3772, and when length_CE=1152 and length_TRN=640, a value of M may be up to 4. For another example, when RCFO=4 ppm, (length_CE+M×length_TRN)<7544, when length_CE=1152 and length_TRN=640, a value of M may be up to 9, when length_CE=640 and length_TRN=640, a value of M may be up to 10. Similarly, when RCFO=2 ppm, (length_CE+M×length_TRN)<15089, and when length_CE=1152 and length_TRN=640, a value of M may be up to 21. Both the CE length and a CE-to-TRN proportion when the SNR is −1 dB can be significantly less than those when the SNR is −10 dB.

It can be learned that, in this specific embodiment, a value of N is 1. In addition, it should be noted that the foregoing described "a value of M may be up to 4, 9, 10, or 21" indicates a maximum value that may be the value of M. M may alternatively be another value. For example, when the value of M may be up to 9, any positive integer less than 9 may be the value of M. In addition, the foregoing simulation results are related to parameter selection. Different simulation results may be obtained by selecting different parameters. For example, in addition to 90% of RCFOs, another proportion of RCFOs, such as 95% or 99%, may also be used. Ratios, of the quantity of eBRP-CE sub-fields in the training field to the quantity of eBRP-TRN sub-fields in the training field, obtained using different proportions of RCFOs are possibly different. For another example, this specific embodiment is obtained through simulation based on parameters in the IEEE 802.11ad, and a different result may be obtained based on another parameter. Therefore, this specific embodiment is merely for helping a person skilled in the art better understand the technical solutions of the present disclosure, instead of limiting the technical solutions.

Optionally, in another embodiment, determining, by a first device, a format of an enhanced Beam Refinement Protocol eBRP packet includes determining, by the first device, a transmission channel quantity C, and determining that each eBRP-CE sub-field in the training field is composed of C×S Gray codes, where S is a positive integer less than 9, and C is determined by the transmission channel quantity of the first device, determining, by the first device, a transmission channel quantity C, and determining that the eBRP-CE sub-field in the training field includes a first eBRP-CE sub-field and a second eBRP-CE sub-field, where each first eBRP-CE sub-field is composed of C×S Gray codes, and each second eBRP-CE sub-field is composed of nine Gray codes, S is a positive integer less than 9, and C is a positive integer greater than or equal to 1, or determining, by the first device, a transmission channel quantity C, and determining that each eBRP-CE sub-field in the training field is composed of C×9 Gray codes, and determining, by the first device, that a quantity N of eBRP-CE sub-fields in the training field, a quantity M of eBRP-TRN sub-fields in the training field, and a quantity Y of Gray codes that compose each eBRP-TRN sub-field in the training field meet the following formula 9×C×N:Y×M<9:20.

Further, for example, in a single channel transmission mode, a value of C is 1. If a value of S is 5, that is, each eBRP-CE sub-field is composed of five Gray codes, in this case, values of N, M, and Y only need to meet Formula 1.1. For example, the values of N, M, and Y may be the same as those in the IEEE 802.11ad standard, that is, N=1, M=4, and Y=5. In this case, the ratio of the quantity of Gray codes that compose the eBRP-CE sub-field in the training field to the quantity of Gray codes that compose the eBRP-TRN sub-field in the training field is 5:20, and this meets Formula 1.1. For another example, N=1, M is a positive integer greater than 4, and Y=5. In this case, the ratio of the quantity of Gray codes that compose the eBRP-CE sub-field in the training field to the quantity of Gray codes that compose the eBRP-TRN sub-field in the training field is less than 5:20, and this can also meet Formula 1.1. Similarly, if the eBRP-CE sub-field includes the first eBRP-CE sub-field and the second eBPR-CE sub-field, the values of N, M, and Y may be set such that Formula 1.1 is workable. If a value of X is 9, the values of N, M, and Y may also be set such that Formula 1.1 is workable. For example, N=1, M=5, and Y=5. In this case, the ratio of the quantity of Gray codes that compose the eBRP-CE sub-field in the training field to the quantity of Gray codes that compose the eBRP-TRN sub-field in the training field is 9:25, and is less than 9:20. In a case of multi-channel bonding, a value of C is the same as the channel quantity. In this case, each eBRP-CE sub-field is composed of C×S Gray codes. In this case, values of N, M, and Y need to make the following formula workable C×S×N:Y×M<9:20.

Optionally, in another embodiment, determining, by a first device, a format of an enhanced Beam Refinement Protocol eBRP packet includes determining, by the first device, a transmission channel quantity C, and determining that each eBRP-TRN sub-field in the training field is composed of C×Y Gray codes, where Y is a positive integer greater than or equal to 5, C is a positive integer greater than or equal to 1, and when Y is a positive integer equal to 5, a quantity N of eBRP-CE sub-fields in the training field, a quantity X for each eBRP-CE sub-field in the training field, and a quantity M of eBRP-TRN sub-fields in the training field meet the following formula X×N:5×C×M<9:20.

Further, for example, in a single channel transmission mode, C=1. If a value of Y is 10, that is, each eBRP-TRN sub-field is composed of 10 Gray codes, in this case, values of N, M, and X only need to meet Formula 1.1. For example, the values of N, M, and X may be the same as those in the IEEE 802.11ad standard, that is, N=1, M=4, and X=9. In this case, the ratio of the quantity of Gray codes that compose the eBRP-CE sub-field in the training field to the quantity of Gray codes that compose the eBRP-TRN sub-field in the training field is 9:40, and this meets Formula 1.1. For another example, N=1, M is a positive integer greater than 4, and X=9. In this case, the ratio of the quantity of Gray codes that compose the eBRP-CE sub-field in the training field to the quantity of Gray codes that compose the eBRP-TRN sub-field in the training field is less than 9:40, and this can also meet Formula 1.1. Similarly, if each eBRP-TRN sub-field is composed of nine Gray codes, the values of N, M, and X may be set such that Formula 1.1 is workable. If a value of Y is 5, the values of N, M, and X may also be set such that Formula 1.1 is workable. For example, N=1, M=5, and X=9. In this case, the ratio of the quantity of Gray codes that compose the eBRP-CE sub-field in the training field to the quantity of Gray codes that compose the eBRP-TRN sub-field in the training field is 9:25, and is less than 9:20. In a case of multi-channel bonding, a value of C is the same as the channel quantity. In this case, each eBRP-TRN sub-field is composed of C×Y Gray codes. In this case, values of X, N, and M need to make the following formula workable: X×N:Y×C×M<9:20.

It can be understood that, the quantity of Gray codes that compose each eBRP-CE sub-field in the training field and the quantity of Gray codes that compose each eBRP-TRN sub-field in the training field may alternatively be other quantities, provided that the quantity of Gray codes that compose each eBRP-CE sub-field in the training field and the quantity of Gray codes that compose each eBRP-TRN sub-field in the training field meet Formula 1.1.

Optionally, in another embodiment, determining, by a first device, a format of an eBRP packet further includes, when an antenna quantity of the first device is 1 or 2, determining, by the first device, that a length of each Gray code in each eBRP-CE sub-field and each eBRP-TRN sub-field in the training field is 128×$C_1$, when an antenna quantity of the first device is 3 or 4 and the eBRP-TRN sub-field in the training field is composed of 10×$C_2$ Gray codes, determining, by the first device, that a length of each Gray code in each eBRP-CE sub-field in the training field is $128 \times C_1$, and determining that a length of each Gray code in each eBRP-TRN sub-field in the training field is $128 \times C_1$ or $64 \times C_1$, when an antenna quantity of the first device is 3 or 4 and the eBRP-TRN sub-field in the training field is composed of $9 \times C_2$ Gray codes, determining, by the first device, that a length of each Gray code in each eBRP-CE sub-field and each eBRP-TRN sub-field in the training field is $128 \times C_1$, or when an antenna quantity of the first device is 4 and the eBRP-TRN sub-field in the training field is composed of $5 \times C_2$ Gray codes, determining, by the first device, that a length of each Gray code in each eBRP-CE sub-field and each eBRP-TRN sub-field in the training field is $128 \times C_1$, where when $C_2=1$, $C_1$ is determined by a transmission channel quantity of the first device, or when $C_2$ is determined by a transmission channel quantity of the first device, $C_1=1$. Obviously, the transmission channel quantity shall be a positive integer greater than or equal to 1.

Further, to maintain compatibility with the IEEE 802.11ad, in single channel transmission, if the ratio of N:M is less than 1:4, in an implementation, a format of the eBRP-TRN sub-field is the same as a format of a TRN sub-field in the IEEE 802.11ad. That is, the eBRP-CE sub-field is composed of nine Gray codes whose lengths are 128, and the eBRP-TRN sub-field is composed of five Gray codes whose lengths are 128. If the ratio of N:M is equal to 1:4, in an implementation, the first device may determine that each eBRP-CE sub-field in the training field is composed of five Gray codes, and determine that each eBRP-TRN sub-field in the training field is composed of five Gray codes. In this case, the ratio of the quantity of Gray codes that compose the eBRP-CE sub-field in the training field to the quantity of Gray codes that compose the eBRP-TRN sub-field in the training field is 5:20, and is less than 9:20. Further, to maintain the compatibility with the IEEE 802.11ad, a portion of a CE sub-field in the IEEE 802.11ad, that is, five of nine Gray codes whose lengths are 128, may be selected as the eBRP-CE sub-field, and a format used for the eBRP-TRN sub-field is the same as the format of the TRN sub-field in the IEEE 802.11ad. In this way, a ratio of time occupied by the eBRP-CE sub-field in the training field to time occupied by the eBRP-TRN sub-field in the training field is reduced i.e., more eBRP-TRN sub-fields can be sent within a same period of time. Therefore, more beams can be trained and training efficiency is improved. For another example, if the ratio of N:M is equal to 1:4, in another implementation, the first device determines that the eBRP-CE sub-field in the training field includes a first eBRP-CE sub-field and a second eBRP-CE sub-field, where each first eBRP-CE sub-field is composed of X Gray codes, and each second eBRP-CE sub-field is composed of nine Gray codes. X is a positive integer less than 9. A proportion of the first eBRP-CE sub-field to the second eBRP-CE sub-field is greater than or equal to 1:1. When each first eBRP-CE sub-field in the training field is composed of five Gray codes, each eBRP-TRN sub-field in the training field is composed of five Gray codes, and the proportion of the first eBRP-CE sub-field to the second eBRP-CE sub-field is equal to 1:1, the ratio of the quantity of Gray codes that compose the eBRP-CE sub-field in the training field to the quantity of Gray codes that compose the eBRP-TRN sub-field in the training field is 7:20, and is less than 9:20. Further, to maintain the compatibility with the IEEE 802.1 lad, a portion of the CE sub-field in the IEEE 802.11ad, that is, five of nine Gray codes whose lengths are 128, may be selected as the first eBRP-CE sub-field, and a format used for the eBRP-TRN sub-field is the same as the format of the TRN sub-field in the IEEE 802.11ad. In this way, a ratio of time occupied by the eBRP-CE sub-field in the training field to time occupied by the eBRP-TRN sub-field in the training field is reduced i.e., more eBRP-TRN sub-fields can be sent within a same period of time. Alternatively, shortening the CE length in the training field and reducing a proportion of the CE in the training field may both be used. Therefore, more beams can be trained and training efficiency is improved. Details are not described herein again.

To support channel bonding that is newly used in the IEEE 802.11ay, the eBRP-CE sub-field is extended based on a format of the CE sub-field in the IEEE 802.11ad, and the eBRP-TRN sub-field is extended based on the format of the TRN sub-field in the IEEE 802.1 lad. Both a method for reducing the CE-to-TRN proportion in the training field and a method for shortening the CE length are used to reduce overheads during beam training.

Further, direct sampling rate extension is used as an extension manner, and when two adjacent channels are bonded, a sampling rate is twice that in single channel transmission. When three adjacent channels are bonded, a sampling rate is three times that in single channel transmission. When four adjacent channels are bonded, a sampling rate is four times that in single channel transmission. The rest may be deduced by analogy. In this way, when Z (Z is a positive integer greater than or equal to 1) channels are bonded, time of the eBRP-CE sub-field and the eBRP-TRN sub-field is unchanged, but sampling points included in the eBRP-CE sub-field and the eBRP-TRN sub-field are Z times original sampling points.

For example, it is assumed that the ratio of N:M is less than 1:4. In a possible implementation, the first device may determine that the eBRP-CE sub-field is composed of nine Gray codes whose lengths are $Z \times 128$, and the eBRP-TRN sub-field is composed of five Gray codes whose lengths are $Z \times 128$. In another possible implementation, the first device may determine that the eBRP-CE sub-field is composed of $9 \times Z$ Gray codes whose lengths are 128, and the eBRP-TRN sub-field may be composed of $5 \times Z$ Gray codes whose lengths are 128.

For another example, it is assumed that the ratio of N:M is equal to 1:4. In a possible implementation, the eBRP-CE sub-field may be composed of five Gray codes whose lengths are $Z \times 128$, and the eBRP-TRN sub-field may be composed of five Gray codes whose lengths are $Z \times 128$. Similar to that in the single channel transmission, to maintain the compatibility with the IEEE 802.11ad, a portion of the CE sub-field in the IEEE 802.11ad, that is, five of nine Gray codes whose lengths are $Z \times 128$, may be selected as the eBRP-CE sub-field. In another possible implementation, the eBRP-CE sub-field may be composed of $5 \times Z$ Gray codes whose lengths are 128, and the eBRP-TRN sub-field may be composed of $5 \times Z$ Gray codes whose lengths are 128. In this way, a ratio of time occupied by the eBRP-CE sub-field in the training field to time occupied by the eBRP-TRN sub-field in the training field is reduced. In another possible implementation, the first device may determine that the eBRP-CE sub-field in the training field includes a first eBRP-CE sub-field and a second eBRP-CE sub-field, where each first eBRP-CE sub-field is composed of $5 \times Z$ Gray codes whose lengths are 128, and each second eBRP-CE sub-field is composed of $9 \times Z$ Gray codes whose lengths are 128, and determine that each eBRP-TRN sub-field in the training field is composed of $5 \times Z$ Gray codes whose lengths are 128. In another possible implementation, the first device may determine that the eBRP-CE sub-field in the training field includes a first eBRP-CE sub-field and a second eBRP-CE sub-field, where each first eBRP-CE sub-field is composed of five Gray codes whose lengths are 128×Z, and each second eBRP-CE sub-field is composed of nine Gray codes whose lengths are 128×Z, and determine that each eBRP-TRN sub-field in the training field is composed of five Gray codes whose lengths are 128×Z. Similarly, to maintain the compatibility with the IEEE 802.11ad, a portion of the CE sub-field in the IEEE 802.11ad, that is, five of nine Gray codes whose lengths are Z×128, may be selected as the first eBRP-CE sub-field.

In this way, a ratio of the time occupied by the eBRP-CE sub-field in the training field to the time occupied by the eBRP-TRN sub-field in the training field is reduced i.e., more eBRP-TRN sub-fields can be sent within a same period of time. Alternatively, shortening the CE length in the training field (shortening a length of all CE sub-fields in the training field or shortening a length of some CE sub-fields in the training field) and reducing a proportion of the CE in the training field may both be used. Therefore, more beams can be trained and training efficiency is improved. Details are not described herein again.

Optionally, in another embodiment, when MIMO training is supported, determining, by a first device, a format of an eBRP packet further includes, when an antenna quantity of the first device exceeds 1, determining, by the first device, that there is at least one pair of Gray code complementary sequences in each codeword of an orthogonal mask of the eBRP-CE sub-field and the eBRP-TRN sub-field, where eBRP-CE sub-fields and eBRP-TRN sub-fields in training fields of a plurality of antennas are sent in an orthogonal mask manner. There are only five Gray codes in a TRN sub-field in the IEEE 802.11ad. When the antenna quantity is relatively large, it cannot be ensured that there is at least one pair of Gray code complementary sequences in each codeword. A pair of Gray code complementary sequences have a desirable characteristic of the sum of autocorrelation (the sum of Autocorrelation). To be specific, a pair of Gray code complementary sequences (Ga, Gb) meet a requirement that AC (Ga)+AC (Gb) has a peak only in a case of perfect alignment, and another position is 0 (a side lobe is 0), where AC( ) represents an autocorrelation function. However, a single Gray code does not have the foregoing characteristic. Therefore, in an environment of multi-channel measurement, performance of channel estimation decreases. According to the present disclosure, a manner of extending a Gray code quantity is used to ensure the performance of channel estimation.

Further, the first device may determine, based on the antenna quantity of the first device and an antenna polarization direction of the first device, the quantity of Gray codes that compose each eBRP-CE sub-field in the training field and the quantity of Gray codes that compose each eBRP-TRN sub-field in the training field. Further, determining, by the first device based on the antenna quantity of the first device and an antenna polarization direction of the first device, the quantity of Gray codes that compose each eBRP-CE sub-field in the training field and the quantity of Gray codes that compose each eBRP-TRN sub-field in the training field includes, when the antenna quantity of the first device is 1 or 2 and an antenna of the first device is a co-polarized antenna, determining, by the first device, that each eBRP-CE sub-field in the training field is composed of $5 \times C_2$ Gray codes, and determining that each eBRP-TRN sub-field in the training field is composed of five Gray codes, when the antenna quantity of the first device is 3 or 4 and an antenna of the first device is a co-polarized antenna, determining, by the first device, that each eBRP-CE sub-field in the training field is composed of $9 \times C_2$ Gray codes, and determining, by the first device, that each eBRP-TRN sub-field in the training field is composed of $10 \times C_2$ Gray codes or $9 \times C_2$ Gray codes, or when the antenna quantity of the first device is 2 or 4 and an antenna of the first device is a cross-polarized antenna, determining, by the first device, that each eBRP-CE sub-field in the training field is composed of $5 \times C_2$ Gray codes, and determining that each eBRP-TRN sub-field in the training field is composed of $5 \times C_2$ Gray codes, where $C_2=1$ or $C_2$ is determined by a transmission channel quantity of the first device.

Further, determining, by a first device, a format of an eBRP packet further includes, when the antenna quantity of the first device is 1 or 2, determining, by the first device, that a length of each Gray code in each eBRP-CE sub-field and each eBRP-TRN sub-field in the training field is $128 \times C_1$, when the antenna quantity of the first device is 3 or 4 and the eBRP-TRN sub-field in the training field is composed of $10 \times C_2$ Gray codes, determining, by the first device, that a length of each Gray code in each eBRP-CE sub-field in the training field is $128 \times C_1$, and determining that a length of each Gray code in each eBRP-TRN sub-field in the training field is $128 \times C_1$ or $64 \times C_1$, when the antenna quantity of the first device is 3 or 4 and the eBRP-TRN sub-field in the training field is composed of $9 \times C_2$ Gray codes, determining, by the first device, that a length of each Gray code in each eBRP-CE sub-field and each eBRP-TRN sub-field in the training field is $128 \times C_1$, or when the antenna quantity of the first device is 4 and the eBRP-TRN sub-field in the training field is composed of $5 \times C_2$ Gray codes, determining, by the first device, that a length of each Gray code in each eBRP-CE sub-field and each eBRP-TRN sub-field in the training field is $128 \times C_1$, where when $C_2=1$, $C_1$ is determined by the transmission channel quantity of the first device, or when $C_2$ is determined by the transmission channel quantity of the first device, $C_1=1$.

Using single channel transmission as an example, in a single channel transmission mode, $C_1=1$, and $C_2=1$. In a co-polarized antenna configuration, when the antenna quantity of the first device is 1 or 2, the orthogonal mask includes two code elements, and the first device may determine that the eBRP-CE sub-field in the training field is composed of five Gray codes, and determine that the eBRP-TRN sub-field in the training field is composed of five Gray codes. Therefore, 2<5/2 Gray codes are masked using each of the two codewords of the orthogonal mask. Therefore, there is at least one pair of Gray code complementary sequences in each codeword of the orthogonal mask. In the co-polarized antenna configuration, when the antenna quantity of the first device is 3 or 4, the first device may determine that the eBRP-CE sub-field in the training field is composed of nine Gray codes and the orthogonal mask includes four code elements, and determine that the eBRP-TRN sub-field in the training field is composed of 10 Gray codes. Alternatively, when the antenna quantity of the first device is 3 or 4, the first device may determine that the eBRP-TRN sub-field in the training field is composed of nine Gray codes. Therefore, 2 (<9/4,10/4) Gray codes are masked using each of the four codewords of the orthogonal mask. Therefore, there is at least one pair of Gray code complementary sequences in each codeword of the orthogonal mask. In this way, an orthogonal mask is used for eBRP-TRNs transmitted using different transmit antennas such that a plurality of antennas can be simultaneously trained and beam training efficiency is also improved. Further, when the antenna quantity of the first device is 1 or 2, the first device may determine that the length of each Gray code in each eBRP-CE sub-field and each eBRP-TRN sub-field in the training field is 128, in the co-polarized antenna configuration, when the antenna quantity of the first device is 3 or 4 and the eBRP-TRN sub-field in the training field is composed of 10 Gray codes, the first device may determine that the length of each Gray code in each eBRP-CE sub-field in the training field is 128, and determine that the length of each Gray code in each eBRP-TRN sub-field in the training field is 64, or when the antenna quantity of the first device is 3 or 4 and the eBRP-TRN sub-field in the training field is composed of nine Gray codes, the first device may determine that the length of each Gray code in each eBRP-CE sub-field in the training field is 128, and determine that the length of each Gray code in each eBRP-TRN sub-field in the training field is 128.

For example, in the co-polarized antenna configuration, when the antenna quantity of the first device is 2, a last half portion of the CE field in the preamble field may be used as the eBRP-CE sub-field. For example, a last half portion of a single carrier (also referred to as SC) mode CE, Gv512+ Gv128, that is, [−Gb128 Ga128 −Gb128 −Ga128 −Gb128], is used as the eBRP-CE sub-field. A last half portion of an Orthogonal Frequency Division Multiplex (OFDM) mode CE, Gu521+Gv128, that is, [−Gb128 −Ga128 Gb128 −Ga128 −Gb128], may also be used as the eBRP-CE sub-field. When eBRP-CE sub-fields and eBRP-TRN sub-fields of two antennas use orthogonal masks [1 1] and [1 −1] respectively, because both lengths of the eBRP-CE sub-fields and lengths of the eBRP-TRN sub-fields are not in perfect alignment with lengths of the masks, masking may start with a first Gray code using the orthogonal masks, or masking may end with a last Gray code using the orthogonal masks. When masking starts with the first Gray code, an eBRP-CE sub-field in a training field transmitted by an antenna 1 is [−Gb128 Ga128 −Gb128 −Ga128 −Gb128], and an eBRP-CE sub-field in a training field transmitted by an antenna 2 is [−Gb128 Ga128 Gb128 Ga128 −Gb128]. An eBRP-TRN sub-field transmitted by the antenna 1 is [Ga128, −Gb128 Ga128 Gb128 Ga128], and an eBRP-TRN sub-field transmitted by the antenna 2 is [Ga128 −Gb128 −Ga128 −Gb128 Ga128]. That is, in the eBRP-TRN sub-field, there are a pair of Gray complementary sequences [Ga128 −Gb128] in a first codeword of the corresponding orthogonal mask, and a pair of Gray complementary sequences [Ga128 Gb128] in a second codeword of the orthogonal mask. The Gray complementary sequence has a good autocorrelation characteristic such that precision of beam training measurement can be ensured. When masking ends with the last Gray code, the eBRP-CE sub-field in the training field transmitted by the antenna 1 is [−Gb128 Ga128 −Gb128 −Ga128 −Gb128], and the eBRP-CE sub-field in the training field transmitted by the antenna 2 is [−Gb128 Ga128 −Gb128 Ga128 Gb128]. The eBRP-TRN sub-field transmitted by the antenna 1 is [Ga128, −Gb128 Ga128 Gb128 Ga128], and the eBRP-TRN sub-field transmitted by the antenna 2 is [Ga128 −Gb128 Ga128 −Gb128 −Ga128]. Certainly, when determining the eBRP-CE sub-field in the training field, the first device may alternatively not differentiate an SC mode sequence and an OFDM mode sequence i.e., sequence designs of eBRP-CE sub-fields in training fields, of different modes (the OFDM mode or the SC mode), transmitted by a transmitter of the first device may be the same. This brings the following benefit, where both an SC mode device and an OFDM mode device can receive a training field, to perform beam training. It can be understood that the foregoing example in which [1,1] and [1,−1] are respectively used as the masks of the antenna 1 and the antenna 2 is used merely as an example. The masks of the antenna 1 and the antenna 2 may alternatively be [1,−1] and [1, 1] respectively.

For another example, in the co-polarized antenna configuration, when the antenna quantity of the first device is 4, the eBRP-CE sub-field in the training field may be the same as a CE sub-field in a training field in a Beam Refinement Protocol packet in the IEEE 802.11ad standard. For example, an SC mode eBRP-CE sub-field may be [−Gb128 −Ga128 Gb128 −Ga128 −Gb128 Ga128 −Gb128 −Ga128 −Gb128], and an OFDM PHY eBRP-CE sub-field may be [−Gb128 −Ga128 Gb128 −Ga128 −Gb128 Ga128 −Gb128 −Ga128 −Gb128]. When a structure of the eBRP-TRN sub-field is nine Gray codes whose lengths are 128, the eBRP-TRN sub-field is four pairs of Gray complementary codes and a suffix. For example, the eBRP-TRN sub-field may be [−Ga128 Gb128 −Ga128 −Gb128 −Ga128 −Gb128 Ga128 −Gb128 −Ga128]. A length of the suffix may be 128 sampling points in order to implement block separation and phase estimation. In a refinement manner, a characteristic similar to that of the CE sub-field in the training field in the Beam Refinement Protocol packet is maintained. Different antennas may use orthogonal masks [1,1,1,1], [1,1,−1,−1], [1,−1,1,−1], and [1,−1,−1,1], to perform extension. Masking may start with a first Gray code using the orthogonal masks, or masking may end with a last Gray code using the orthogonal masks. When a structure of the eBRP-TRN sub-field is 10 Gray codes whose lengths are 64, the TRN sub-field is four pairs of Gray complementary codes and a suffix. For example, the eBRP-TRN sub-field may be [−Ga64 Gb64 −Ga64 −Gb64 Ga64 −Gb64 Ga64 Gb64 −Ga64 Gb64]. Similar to the case of two antennas, there is a pair of Gray complementary sequences in each codeword of a corresponding orthogonal mask. A length of the suffix may be 128 sampling points in order to implement block separation and phase estimation. Therefore, a first Gray code is the same as a ninth Gray code, and a second Gray code is the same as a tenth Gray code. Different antennas may use orthogonal masks [1,1,1,1], [1,1,−1,−1], [1,−1,1,−1], and [1,−1,−1,1] to perform extension. Definitions in the IEEE 802.11ad may be used for the Ga64, the Gb64, the Ga128, and the Gb128 herein. Another orthogonal mask may also be used. This is not limited herein. When the TRN field is extended, both a method for shortening the CE length in the training field (shortening a length of all CE sub-fields in the training field or shortening a length of some CE sub-fields in the training field) and a method for reducing a proportion of the CE in the training field may also be combined. Therefore, more beams can be trained and training efficiency is improved. Details are not described herein again.

When the antenna quantity is 1 or 2, time occupied by the eBRP-CE sub-field is less than time occupied by the CE sub-field in the training field in the IEEE 802.11ad standard. In this way, a ratio of the time occupied by the eBRP-CE sub-field in the training field to time occupied by the eBRP-TRN sub-field in the training field is reduced i.e., more eBRP-TRN sub-fields can be sent within a same period of time. Therefore, more beams can be trained and training efficiency is improved. When the antenna quantity is 3 or 4, the quantity of Gray codes included in the eBRP-TRN sub-field is greater than a quantity of Gray codes included in the TRN sub-field in the IEEE 802.11ad standard, and if a Gray sequence, whose length is 128, the same as the TRN sub-field in the IEEE 802.1 lad is used, training efficiency may not necessarily be improved. However, considering that transmission is performed in the orthogonal mask manner, a plurality of transmit antennas may be simultaneously trained, and beaming training efficiency is also higher than that of the BRP packet in the IEEE 802.11ad. Therefore, a refinement consideration is that a sequence length shorter than the TRN sub-field in the IEEE 802.11ad, that is, 128/2=64, is used for the eBRP-TRN. Further, there is at least one pair of Gray code complementary sequences in each codeword of the orthogonal mask such that precision of beam training measurement can be ensured.

For another example, in a cross-polarized antenna configuration, when the antenna quantity of the first device is 2, an antenna may transmit a same training field in two orthogonal polarization directions, to perform training. For example, without differentiating antennas in different polarization directions using the orthogonal mask, the first device may determine that the eBRP-CE sub-field in the training field is composed of five Gray codes, and determine that the eBRP-TRN sub-field in the training field is composed of five Gray codes. When the antenna quantity of the first device is 4, two co-polarized antennas use an orthogonal mask whose length is 2. The orthogonal mask includes two elements, and the first device may determine that the eBRP-CE sub-field in the training field is composed of five Gray codes, and determine that the eBRP-TRN sub-field in the training field is composed of five Gray codes. Therefore, 2<5/2 Gray codes are masked using each of the two codewords of the orthogonal mask. Therefore, there is at least one pair of Gray code complementary sequences in each codeword of the orthogonal mask. In this way, an orthogonal mask is used for eBRP-TRNs transmitted using different transmit antennas such that a plurality of antennas can be simultaneously trained and beam training efficiency is also improved.

For example, it is assumed that the first device uses four cross-polarized antennas. Further, an antenna 1 and an antenna 3 of the first device are in orthogonal polarization directions, an antenna 2 and an antenna 4 of the first device are in orthogonal polarization directions, the antenna 1 and the antenna 2 are co-polarized, and the antenna 3 and the antenna 4 are co-polarized. A last half portion of the CE field in the preamble field may be used as the eBRP-CE sub-field. For example, a last half portion of a single carrier (SC) mode sequence, Gv512+Gv128, that is, [−Gb128 Ga128 −Gb128 −Ga128 −Gb128], is used as the eBRP-CE sub-field. A last half portion of an OFDM mode sequence, Gu521+Gv128, that is, [−Gb128 −Ga128 Gb128 −Ga128 −Gb128], may also be used as the eBRP-CE sub-field. When eBRP-CE sub-fields and eBRP-TRN sub-fields of two co-polarized antennas use orthogonal masks [1 1] and [1 −1] respectively, masking starts with a first Gray code using the orthogonal masks, eBRP-CE sub-fields in training fields transmitted by the antenna 1 and the antenna 3 are [−Gb128 Ga128 −Gb128 −Ga128 −Gb128], and eBRP-CE sub-fields in training fields transmitted by the antenna 2 and the antenna 4 are [−Gb128 Ga128 Gb128 Ga128 −Gb128]. The eBRP-TRN sub-fields transmitted by the antenna 1 and the antenna 3 are [Ga128, −Gb128, Ga128, Gb128, Ga128], and eBRP-TRN sub-fields transmitted by the antenna 2 and the antenna 4 are [Ga128, −Gb128, −Ga128, −Gb128, Ga128]. That is, in the eBRP-TRN sub-field, there are a pair of Gray complementary sequences [Ga128, −Gb128] in a first codeword of the corresponding orthogonal mask, and a pair of Gray complementary sequences [Ga128, Gb128] in a second codeword of the orthogonal mask. The Gray complementary sequence has a good autocorrelation characteristic such that precision of beam training measurement can be ensured. Certainly, when determining the eBRP-CE sub-field in the training field, the first device may alternatively not differentiate an SC mode sequence and an OFDM mode sequence. For example, sequence designs of eBRP-CE sub-fields in training fields, of different modes (the OFDM mode or the SC mode), transmitted by a transmitter of the first device may be the same. This brings the following benefit, where both an SC mode device and an OFDM mode device can receive a training field, to perform beam training. It can be understood that the foregoing example in which [1,1] and [1,−1] are respectively used as the masks of the antenna 1/3 and the antenna 2/4 is used merely as an example. The masks of the antenna 1/3 and the antenna 2/4 may alternatively be [1,−1] and [1, 1] respectively. In addition, there may be a plurality of position relationships between the eBRP-CE sub-field and the eBRP-TRN sub-field in the training field.

The foregoing embodiment is a specific embodiment of single channel transmission. In addition, when both a MIMO technology and channel bonding are supported, when Z (Z is a positive integer greater than or equal to 1) channels are bonded, time of the eBRP-CE sub-field and the eBRP-TRN sub-field is unchanged, but sampling points included in the eBRP-CE sub-field and the eBRP-TRN sub-field are Z times the original sampling points.

eBRP-CE sub-fields and eBRP-TRN sub-fields in training fields of a plurality of antennas are sent in an orthogonal mask manner, and the first device determines that there is at least one pair of Gray code complementary sequences in each codeword of an orthogonal mask of the eBRP-CE sub-fields and the eBRP-TRN sub-fields. Further, in a possible implementation, the eBRP-CE sub-field continues being composed of nine Gray codes whose lengths are Z×128, and the eBRP-TRN sub-field continues being composed of five Gray codes whose lengths are Z×128. In this case, it is possible that a quantity of Gray codes of the eBRP-TRN sub-field is less than two times the antenna quantity, and a processing method is the same as the foregoing description, that is, when a quantity of co-polarized transmit antennas of the first device is 3 or 4, the quantity of Gray codes included in the eBRP-TRN sub-field is extended. Nine Gray codes whose lengths are Z×128 or 10 Gray codes whose lengths are Z×64 may be used to compose the eBRP-TRN. A plurality of antennas of the first device use an orthogonal mask to send a training field. When the TRN field is extended, both a method for shortening the CE length in the training field (shortening a length of all CE sub-fields in the training field or shortening a length of some CE sub-fields in the training field) and a method for reducing a proportion of the CE in the training field may also be combined. Therefore, more beams can be trained and training efficiency is improved. Details are not described herein again.

In another possible implementation, when Z=1, reference may be made to the specific implementation in the single channel transmission mode. Details do not need to be described herein again. When Z is a positive integer greater than or equal to 2, the eBRP-CE sub-field continues being composed of 9×Z Gray codes whose lengths are 128, and the eBRP-TRN sub-field continues being composed of 5×Z Gray codes whose lengths are 128. This is because 5×Z is a positive integer greater than or equal to 10 when Z is a positive integer greater than or equal to 2. In this case, a case that the quantity of Gray codes of the eBRP-TRN sub-field is less than 2 times the antenna quantity does not exist. A plurality of antennas of the first device use an orthogonal mask to send a training field. A method for shortening the CE length in the training field (shortening a length of all CE sub-fields in the training field or shortening a length of some CE sub-fields in the training field) and a method for reducing a proportion of the CE in the training field may be combined.

Therefore, more beams can be trained and training efficiency is improved. Details are not described herein again.

Figure 4:
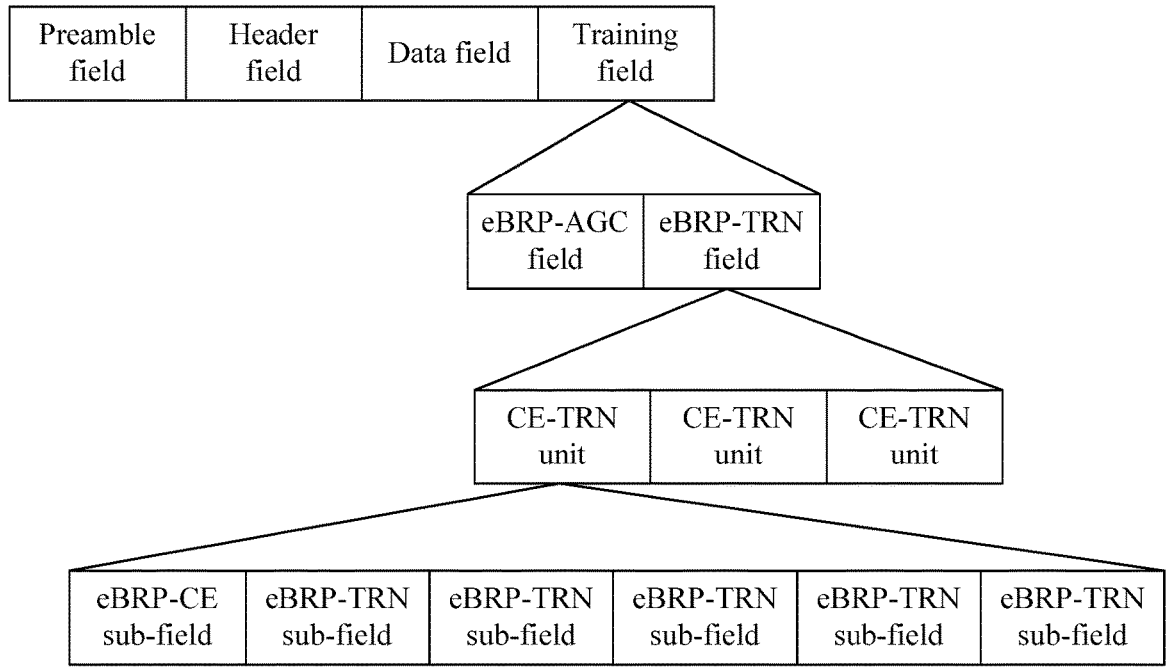
FIG. 4 is a structural block diagram of an eBRP packet according to an embodiment of the present disclosure.

For example, the eBRP-CE sub-fields and the eBRP-TRN sub-fields in the training field may be grouped into a plurality of CE-TRN units. Each CE-TRN unit is composed of an eBRP-CE sub-field and an eBRP-TRN sub-field. Further, each CE-TRN unit may include one eBRP-CE sub-field and at least four eBRP-TRN sub-fields. The at least four eBRP-TRN sub-fields are located after the eBRP-CE sub-field and are successive to the eBRP-CE sub-field. For example, FIG. 4 is a structural block diagram of an eBRP packet according to an embodiment of the present disclosure. The eBRP packet shown in FIG. 4 includes a preamble field, a header field, a data field, and a training field. The training field includes an eBRP-AGC field and an eBRP-TRN field. The eBRP-TRN field includes three CE-TRN units, and each CE-TRN unit includes one eBRP-CE sub-field and five eBRP-TRN sub-fields.

Figure 5:
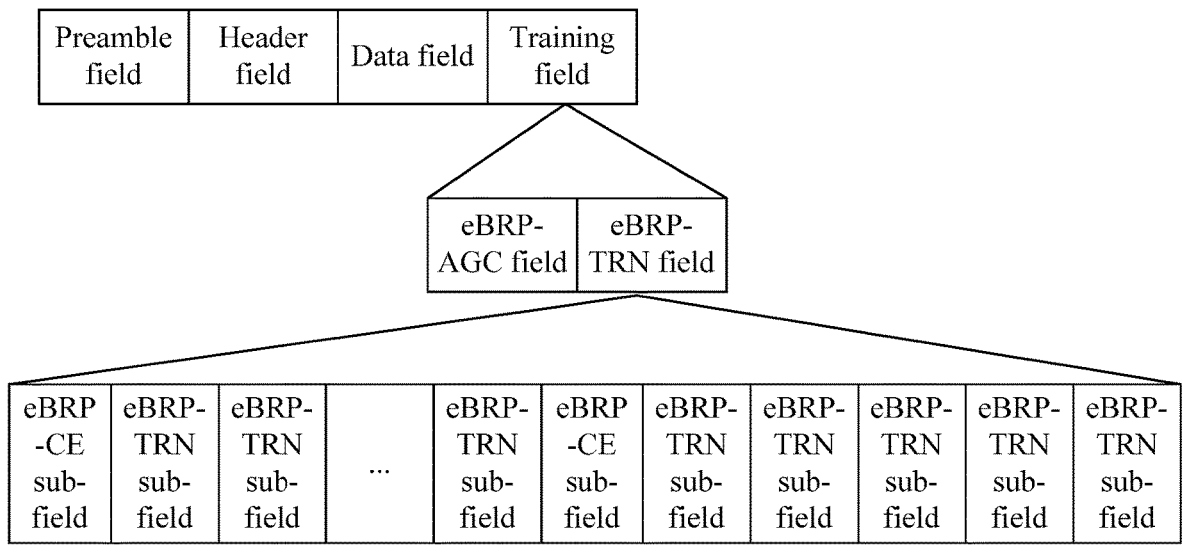
FIG. 5 is a structural block diagram of another eBRP packet according to an embodiment of the present disclosure.

For another example, one or more eBRP-CE sub-fields in the training field may be located in a specified position, and a ratio of a quantity of eBRP-CE sub-fields in the training field to a quantity of eBRP-TRN sub-fields in the training field is less than or equal to 1:4. Assuming that a plurality of eBRP-TRN sub-fields in the training field are successive in order, the specified position is in at least one of the following positions, located prior to a first eBRP-TRN sub-field of the plurality of eBRP-TRN sub-fields, where the eBRP-CE sub-field and the first eBRP-TRN sub-field of the plurality of eBRP-TRN sub-fields are successive, located after a last eBRP-TRN sub-field of the plurality of eBRP-TRN sub-fields, where the eBRP-CE sub-field and the last sub-field of the plurality of eBRP-TRN sub-fields are successive, or located at a middle position of the plurality of eBRP-TRN sub-fields, that is, a quantity of eBRP-TRN sub-fields prior to the eBRP-CE sub-field is the same as a quantity of eBRP-TRN sub-fields after the eBRP-CE sub-field. It can be understood that, the quantity of eBRP-CE sub-fields included in the training field is the same as a quantity of specified positions. Certainly, the specified position may further include a position other than the foregoing three positions. For example, FIG. 5 is a structural block diagram of another eBRP packet according to an embodiment of the present disclosure. As shown in FIG. 5, the enhanced Beam Refinement Protocol packet includes a preamble field, a header field, a data field, and a training field. The training field includes an eBRP-AGC field and an eBRP-TRN field, and the eBRP-TRN field includes two eBRP-CE sub-fields and a plurality of eBRP-TRN sub-fields. As shown in FIG. 5, a first sub-field in the eBRP-TRN field is an eBRP-CE sub-field, a last but four sub-field in the eBRP-TRN field is the other eBRP-CE sub-field, and other sub-fields in the eBRP-TRN field are eBRP-TRN sub-fields. It can be understood that, for ease of description, " . . . " is used in FIG. 5 to represent a plurality of eBRP-TRN sub-fields.

In addition, only a relatively small antenna array element quantity is supported in the IEEE 802.11ad, to be specific, there are no more than 64 array elements in each antenna. Therefore, in the IEEE 802.11ay, more antenna array elements need to be supported. As a result, a receiver gain is estimated by gathering AGC in the training field and using all the gathered AGC fields, thereby imposing a limitation on a receiver dynamic range.

In a possible implementation, a plurality of receiver gains are estimated in an AGC sub-field grouping manner to support a larger receiver dynamic range. Further, the training field may include the eBRP-AGC field, and determining, by a first device, a format of an eBRP packet may include determining, by the first device, that the training field includes K AGC-TRN sub-field groups, where quantities of eBRP-AGC sub-fields and eBRP-TRN sub-fields included in each AGC-TRN sub-field group are the same, the eBRP-AGC sub-fields and the eBRP-TRN sub-fields included in each AGC-TRN sub-field group use a same AWV group, the eBRP-AGC sub-fields are located prior to the eBRP-TRN sub-fields in each AGC-TRN sub-field group, and K is a positive integer greater than or equal to 1. In this way, a receiver may estimate a suitable receiver gain at each AGC-TRN sub-field group, and therefore a larger receiver dynamic range can be obtained. This helps to measure channel information in different AWV configurations. In addition, when the quantity K is the same as the quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

Further, each AGC-TRN sub-field group may further include an eBRP-CE sub-field. Further, a method for shortening a CE length in the training field (shortening a length of all CE sub-fields in the training field or shortening a length of some CE sub-fields in the training field), a method for reducing a proportion of a CE in the training field, and a method for extending a quantity of Gray codes in a TRN sub-field may be combined. Therefore, more beams can be trained and training efficiency is improved. Details are not described herein again.

The eBRP-AGC sub-field, the eBRP-TRN sub-field, and the eBRP-CE sub-field in each AGC-TRN sub-field group may be designed according to formats of a TRN sub-field, an AGC sub-field, and a CE sub-field that are in the IEEE 802.11ad. Further, a method for shortening a CE length in the training field (shortening a length of all CE sub-fields in the training field or shortening a length of some CE sub-fields in the training field), a method for reducing a proportion of a CE in the training field, and a method for extending a quantity of Gray codes in a TRN sub-field may be combined. Therefore, more beams can be trained and training efficiency is improved. Details are not described herein again. Further, the quantities of eBRP-AGC sub-fields and eBRP-TRN sub-fields included in each AGC-TRN sub-field group are the same. However, quantities of eBRP-AGC sub-fields and quantities of eBRP-TRN sub-fields included in any two AGC-TRN sub-field groups may be different. For example, a first AGC-TRN sub-field group includes four eBRP-AGC sub-fields and four eBRP-TRN sub-fields, but a second AGC-TRN sub-field group includes eight eBRP-AGC sub-fields and eight eBRP-TRN sub-fields. This is not particularly limited herein.

Figure 6:
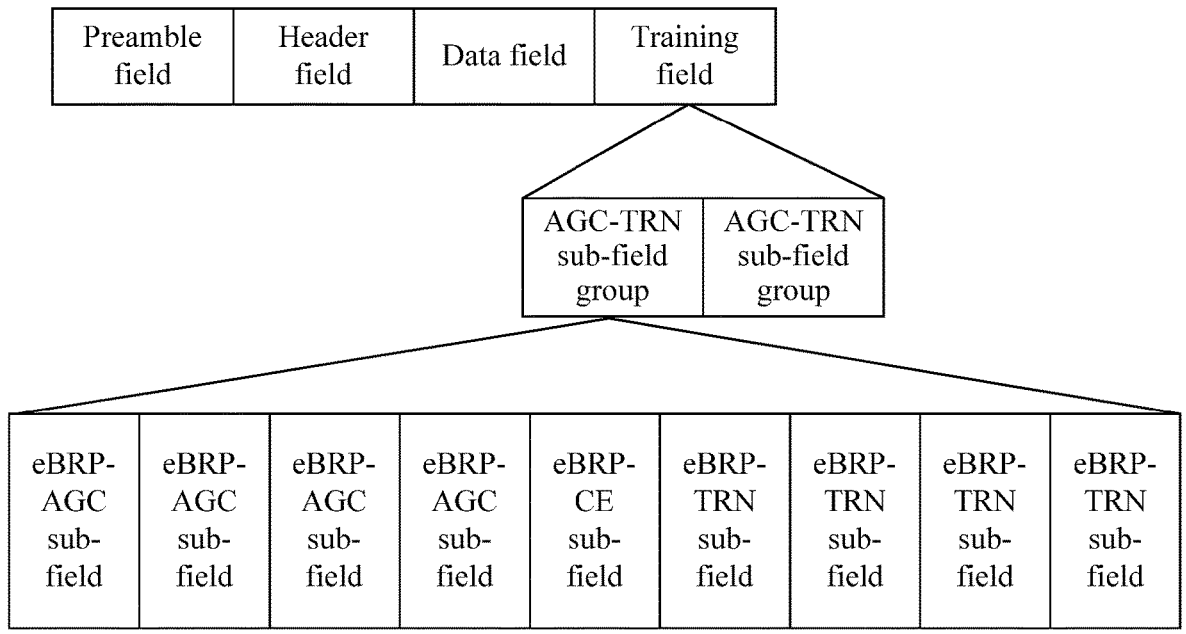
FIG. 6 is a structural block diagram of another eBRP packet according to an embodiment of the present disclosure.

For example, FIG. 6 is a structural block diagram of another eBRP packet according to an embodiment of the present disclosure. The eBRP packet shown in FIG. 6 includes a preamble field, a header field, a data field, and a training field. The training field includes two AGC-TRN sub-field groups, and each AGC-TRN sub-field group includes four eBRP-AGC sub-fields and four eBRP-TRN sub-fields. In addition, each AGC-TRN sub-field group may further include an eBRP-CE sub-field.

Further, the method shown in FIG. 1 may include step 103.

Step 103. The first device sends training field configuration information to the second device, where the training field configuration information is used to indicate a format of the training field in the eBRB packet, and the training field configuration information is carried by any one or more of a Beam Refinement Protocol request field, a beam refinement element, or a header field in the eBRP packet. In this way, the first device can notify the second device of the format of the training field such that the second device performs beam training based on the format of the training field.

The header field herein may be a header field defined in the IEEE 802.11ad, or may be a new header field defined in the IEEE 802.11ay.

The training field may be in one or more of the following formats, a structure of the eBRP-CE sub-field (that is, a quantity and lengths of Gray codes that compose each eBRP-CE sub-field) in the training field, a structure of the eBRP-TRN sub-field (that is, a quantity and lengths of Gray codes that compose each eBRP-TRN sub-field) in the training field, and the ratio of the quantity of eBRP-CE sub-fields in the training field to the quantity of eBRP-TRN sub-fields in the training field. Optionally, the format of the training field may further include at least one of the following, a position of the eBRP-CE sub-field in the training field, a position of the eBRP-TRN sub-field in the training field, and a position and a format of an AGC field in the training field.

The training field configuration information that is used to indicate the format of the training field in the eBRP packet may directly indicate the format of the training field, or may indicate an index corresponding to the format of the training field. For example, formats of different training fields correspond to different indexes, and the training field configuration information is an index corresponding to a format that is of a training field and that needs to be indicated. In addition, the training field configuration information may further be in another form. For example, in the format of the training field, different combinations of a structure of the eBRP-CE sub-field and a structure of the eBRP-TRN sub-field correspond to different indexes, and an index may be indicated in the training field configuration information to determine the structure of the eBRP-CE sub-field and the structure of the eBRP-TRN sub-field that are used. In addition, the training field configuration information is further used to indicate the ratio of the quantity of eBRP-CE sub-fields in the training field to the quantity of eBRP-TRN sub-fields in the training field. In this way, the second device can determine the structure of the eBRP-TRN sub-field and the structure of the eBRP-CE sub-field based on the index, and directly determine the ratio of the quantity of eBRP-CE sub-fields in the training field to the quantity of eBRP-TRN sub-fields in the training field based on the indicated ratio of the quantity of eBRP-CE sub-fields in the training field to the quantity of eBRP-TRN sub-fields in the training field.

It can be understood that, in step 103, the first device definitely indicate the format of the training field to the second device in an explicit indication manner. The first device may further indicate the format of the training field to the second device in an implicit indication manner, for example, an indication manner with reference to a current MCS level.

In addition, before sending the eBRP packet to the second device, the first device may determine a type of the eBRP packet, that is, whether the eBRP packet is used for receive-beam training (hereinafter referred to as an eBRP-RX packet) or transmit-beam training (hereinafter referred to as an eBRP-TX packet). If the eBRP packet is used for transmit-beam training, when sending the eBRP packet, the first device may change an AWV, to perform transmit-beam training. Further, if the eBRP packet sent by the first device is the eBRP-TX packet, a quantity of AWVs that can be trained when the first device sends the training field is related to the quantity of eBRP-TRN sub-fields. When the first device is a single antenna, a quantity of transmit AWVs that are trained is equal to the quantity of eBRP-TRN sub-fields. A plurality of transmit antennas train different AWVs in a code division manner, and therefore simultaneous training may be implemented using an orthogonal mask of the eBRP-TRN sub-fields. Therefore, in a case of a plurality of antennas, a maximum quantity of transmit beams that can be trained is, an antenna quantity X the quantity of eBRP-TRN sub-fields (that is, a product of the antenna quantity and the quantity of eBRP-TRN sub-fields). If the eBRP packet is used for receive-beam training, the first device does not change an AWV when sending the eBRP packet, but the second device changes an AWV when receiving the eBRP packet, to perform receive-beam training. Further, if the eBRP packet sent by the first device is the eBRP-RX packet, the first device does not change the AWV when transmitting the training field. A quantity of AWVs that can be trained when the second device receives the eBRP training field is related to a quantity of eBRP-TRN sub-fields in the eBRP-RX packet sent by the first device. When the second device is a single antenna, a quantity of receive AWVs that are trained is equal to the quantity of eBRP-TRN sub-fields. When a quantity of receive antennas exceeds 1, a quantity of transmit AWVs that can be trained by each transmit antenna is less than or equal to the quantity of eBRP-TRN sub-fields. Different AWV training of the plurality of receive antennas may be implemented in a manner that the plurality of receive antennas receive, using different AWVs, the eBRP-TRN sub-fields sent by the first device. Certainly, beams that need to be trained by the receive antennas are not necessarily the same. Therefore, in a case of a plurality of antennas, a maximum quantity of receive beams that can be trained is an antenna quantity X the quantity of eBRP-TRN sub-fields (that is, a product of the antenna quantity and the quantity of eBRP-TRN sub-fields). When both a quantity of transmit antennas and a quantity of receive antennas are above 1, if the sent eBRP-TRN sub-field differentiates different antennas using an orthogonal mask, each receive antenna of a receiver may simultaneously measure, in one eBRP-TRN sub-field, wireless channels in current transmit AWV configurations of the plurality of transmit antennas and in current receive AWV configurations of the receive antennas. Through one or more rounds of eBRP packet transmitting and receiving, a transmit side and a receive side measure corresponding wireless channels, and select a refined configuration in corresponding transmit AWVs and receive AWVs to perform communication. A process herein may be in compliance with the BRP protocol in the IEEE 802.1 lad and is not particularly limited.

Further, in the IEEE 802.11ad standard, a training field is sent after being modulated based on $\pi/2$ binary phase shift keying (BPSK). In the method shown in FIG. 1, the first device may alternatively use a modulation manner other than the $\pi/2$ BPSK. This is not limited in the present disclosure.

Further, it can be understood that, the foregoing describes merely specific possible implementations that may be obtained based on the technical solutions of the present disclosure. A person skilled in the art may further determine another specific implementation based on the embodiments of the present disclosure. For example, an implementation other than the specific implementations described above may be used for the eBRP-CE sub-field and the eBRP-TRN sub-field provided that Formula 1.1 is met. For example, if the ratio of N:M is less than 1:4, the eBRP-CE sub-field is composed of eight Gray codes whose lengths are 128 and one Gray code whose length is 64, and the eBRP-TRN sub-field is composed of four Gray codes whose lengths are 128 and one Gray code whose length is 64. In this way, a length of the training field and training time can be shortened.

Figure 7:
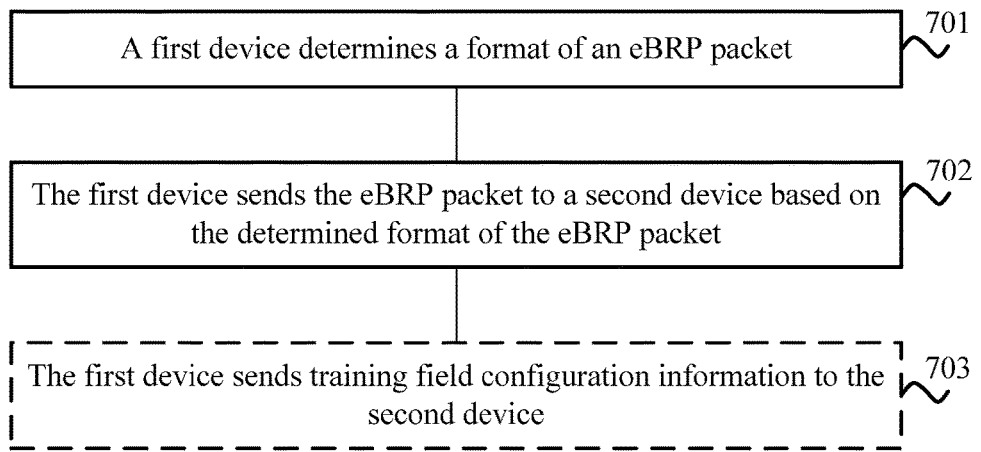
FIG. 7 is a schematic flowchart of another beam refinement method according to an embodiment of the present disclosure.

FIG. 7 is a schematic flowchart of another beam refinement method according to an embodiment of the present disclosure.

Step 701. A first device determines a format of an eBRP packet, where the eBRP packet includes a training field, and the training field is composed of an eBRP-AGC field and an eBPR-TRN sub-field.

In the eBRP packet, except that the training field does not include an eBRP-CE sub-field, other fields are the same as those in the method shown in FIG. 1. Details do not need to be described herein again. The eBRP-AGC sub-field or the eBRP-TRN functions as the eBRP-CE sub-field.

Step 702. The first device sends the eBRP packet to a second device based on the determined format of the eBRP packet.

According to the method shown in FIG. 7, the training field does not include an eBRP-CE sub-field such that an effective proportion of the eBRP-TRN sub-field in the training field is increased, and more AWV configurations can be attempted within a same period of time.

Figure 8:
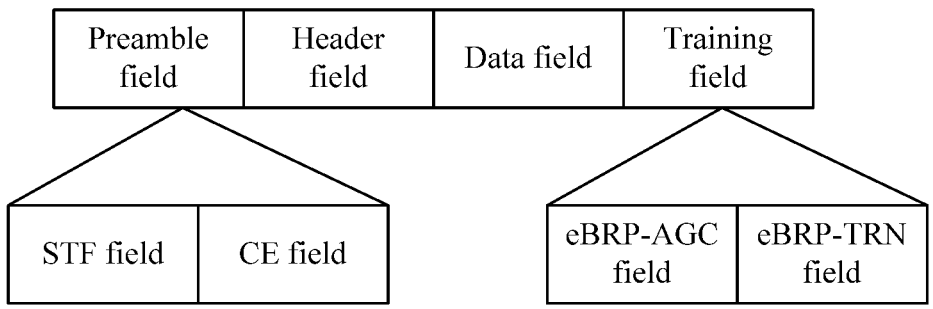
FIG. 8 is a structural block diagram of another eBRP packet according to an embodiment of the present disclosure.

FIG. 8 is a structural block diagram of another eBRP packet according to an embodiment of the present disclosure. A format of the eBRP packet shown in FIG. 8 is a format, of the eBRP packet, determined according to the method shown in FIG. 7. As shown in FIG. 8, the eBRP packet includes a preamble field, a header field, a data field, and a training field. The preamble field includes an STF field and a CE field, and the training field is composed of an eBRP-AGC field and an eBRP-TRN field. Each eBRP-AGC field includes at least four eBRP-AGC sub-fields, and each eBRP-TRN field includes at least four eBRP-TRN sub-fields.

Optionally, in an embodiment, a transmission mode is single channel transmission, and determining, by a first device, a format of an eBRP packet includes, when an antenna quantity of the first device is 1 or 2 and an antenna of the first device is a co-polarized antenna, determining, by the first device, that each eBRP-TRN sub-field in the training field is composed of five Gray codes whose lengths are 128, when an antenna quantity of the first device is 3 or 4 and an antenna of the first device is a co-polarized antenna, determining, by the first device, that each eBRP-TRN sub-field in the training field is in any one of the following formats 10 Gray codes whose lengths are 64 or nine Gray codes whose lengths are 128, or when an antenna quantity of the first device is 2 or 4 and an antenna of the first device is a cross-polarized antenna, determining, by the first device, that each eBRP-TRN sub-field in the training field is composed of five Gray codes whose lengths are 128. When the antenna quantity is 1 or 2, the length of the eBRP-TRN sub-field may be the same as a length of a TRN sub-field in the IEEE 802.11ad standard. In this way, better compatibility with the IEEE 802.11ad can be achieved. However, considering that transmission is performed in an orthogonal mask manner, a plurality of transmit antennas may be simultaneously trained, and beaming training efficiency is also higher than that of an eBRP packet in the IEEE 802.11ad. Further, there is at least one pair of Gray code complementary sequences in each codeword of each segment of orthogonal mask such that precision of beam training measurement can be ensured. When the antenna quantity is 3 or 4, the quantity of Gray codes included in the eBRP-TRN sub-field is greater than a quantity of Gray codes included in the TRN sub-field in the IEEE 802.11ad standard, and if a Gray sequence, whose length is 128, the same as the TRN sub-field in the IEEE 802.11ad is used, training efficiency may not necessarily be improved. However, considering that transmission is performed in the orthogonal mask manner, a plurality of transmit antennas may be simultaneously trained, and beaming training efficiency is also higher than that of a BRP packet in the IEEE 802.11ad. Therefore, a refinement consideration is that a sequence length shorter than the TRN sub-field in the IEEE 802.11ad, that is, 128/2=64, is used for the eBRP-TRN. Further, there is at least one pair of Gray code complementary sequences in each codeword of an orthogonal mask such that precision of beam training measurement can be ensured.

Further, transmission may be performed with reference to a multi-channel bonding technology. Optionally, in another embodiment, determining, by a first device, a format of an eBRP packet further includes, when the antenna quantity of the first device is 1 or 2, determining, by the first device, that a length of each Gray code in each eBRP-TRN sub-field in the training field is $128 \times C_1$, when the antenna quantity of the first device is 3 or 4 and the eBRP-TRN sub-field in the training field is composed of $10 \times C_2$ Gray codes, determining, by the first device, that a length of each Gray code in each eBRP-TRN sub-field in the training field is $128 \times C_1$ or $64 \times C_1$, when the antenna quantity of the first device is 3 or 4 and the eBRP-TRN sub-field in the training field is composed of $9 \times C_2$ Gray codes, determining, by the first device, that a length of each Gray code in each eBRP-TRN sub-field in the training field is $128 \times C_1$, or when the antenna quantity of the first device is 4 and the eBRP-TRN sub-field in the training field is composed of $5 \times C_2$ Gray codes, determining, by the first device, that a length of each Gray code in each eBRP-TRN sub-field in the training field is $128 \times C_1$, where when $C_2=1$, $C_1$ is determined by a transmission channel quantity of the first device, or when $C_2$ is determined by a transmission channel quantity of the first device, $C_1=1$. Obviously, the transmission channel quantity shall be a positive integer greater than or equal to 1.

Figure 9:
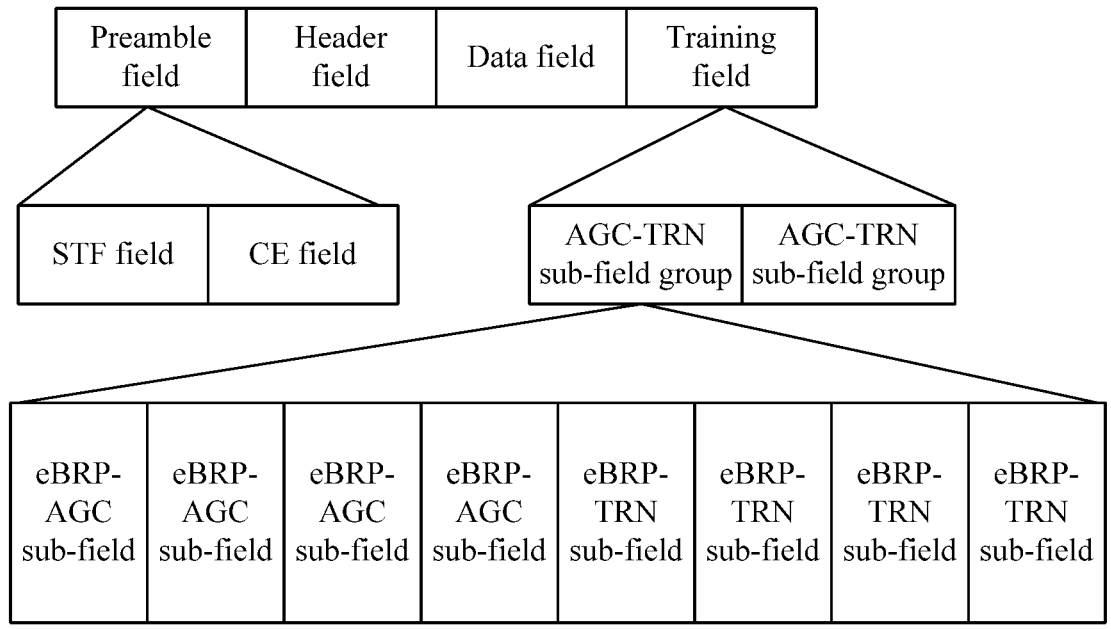
FIG. 9 is a structural block diagram of another eBRP packet according to an embodiment of the present disclosure.

Further, determining, by a first device, a format of an eBRP packet may include determining, by the first device, that the training field includes K AGC-TRN sub-field groups, where quantities of eBRP-AGC sub-fields and eBRP-TRN sub-fields included in each AGC-TRN sub-field group are the same, the eBRP-AGC sub-fields and the eBRP-TRN sub-fields included in each AGC-TRN sub-field group use a same AWV group, the eBRP-AGC sub-fields are located prior to the eBRP-TRN sub-fields in each AGC-TRN sub-field group, and K is a positive integer greater than or equal to 1. Each AGC-TRN sub-field group may determine one receive gain. In this way, a receive dynamic range of a receiver can be enlarged. For example, FIG. 9 is a structural block diagram of another eBRP packet according to an embodiment of the present disclosure. A format of the eBRP packet shown in FIG. 9 is another format, of the eBRP packet, determined according to the method shown in FIG. 7. As shown in FIG. 9, the eBRP packet includes a preamble field, a header field, a data field, and a training field. The preamble field includes an STF field and a CE field, and the training field is composed of two AGC-TRN sub-field groups, and each AGC-TRN sub-field group includes four eBRP-AGC sub-fields and four eBRP-TRN sub-fields. In addition, each AGC-TRN sub-field group does not include an eBRP-CE sub-field.

Figure 10:
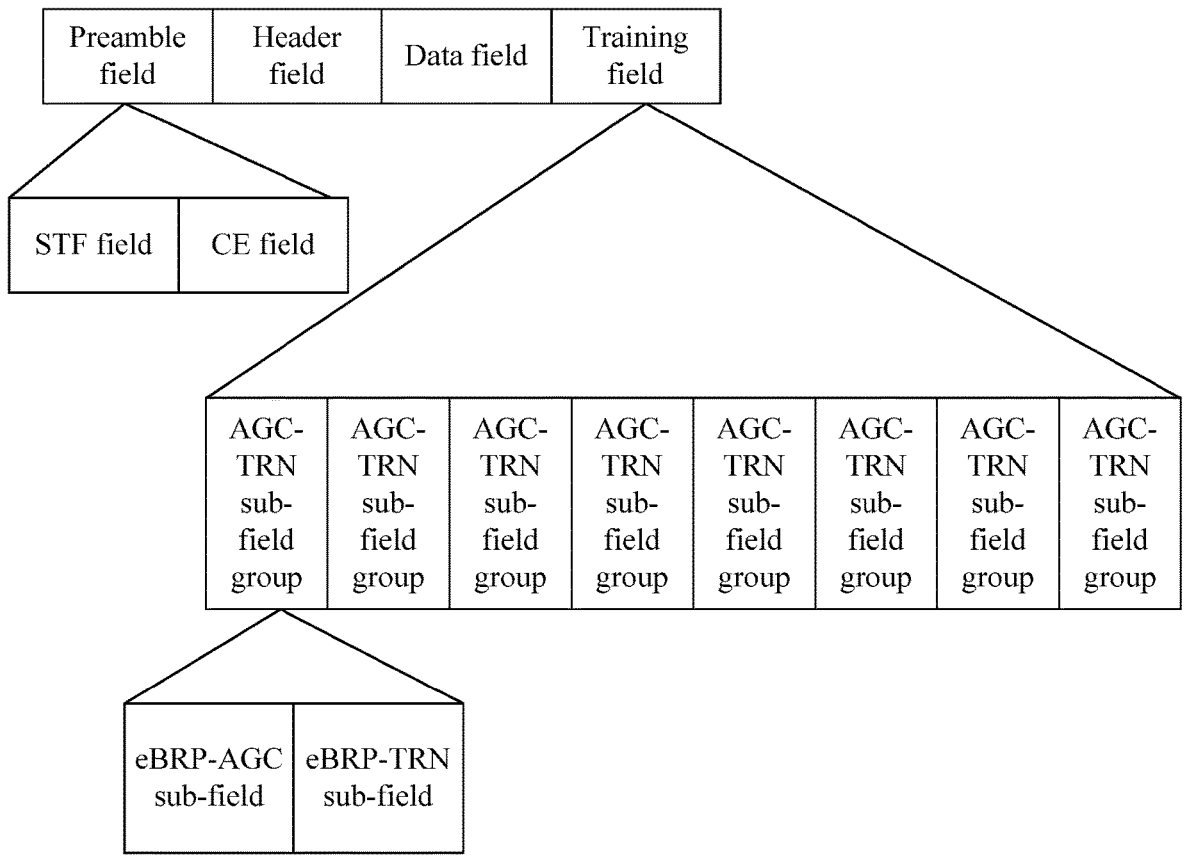
FIG. 10 is a structural block diagram of another eBRP packet according to an embodiment of the present disclosure.

In the method shown in FIG. 7, the training field does not include a CE sub-field, and therefore another sub-field in the eBRP packet functions as the CE sub-field. For example, a function of maintaining time and frequency synchronization between the receiver and a transmitter may be implemented by the eBRP-AGC sub-field or the eBRP-TRN. After a length of the eBRP-AGC sub-field is extended, time that is greater than time occupied by Gray codes in an AGC field part in the IEEE 802.11 ad and that is in an eBRP-AGC part, or time that is greater than a part at the forefront of the eBRP-TRN and that is in an eBRP-AGC part may be used to perform time and frequency synchronization tracking, where the part at the forefront of the eBRP-TRN is previously lost in AWV changing. In this case, each of the K AGC-TRN sub-field groups includes one eBRP-AGC sub-field and one eBRP-TRN sub-field. In this way, AWV changing times can be reduced. Reduction in the AWV changing times is accompanied with reduction in time that cannot be used for measurement in an AWV configuration. It is equivalent to a case in which an effective measurement time period for eBRP-TRN is extended. Therefore, more time may be available for determining magnitudes and phases corresponding to different AWV configurations, thereby helping to determine a refined beam. Further, each eBRP-AGC sub-field is composed of T Gray codes whose lengths are $64 \times C_1$, where T is a positive integer greater than or equal to $5 \times C_2$ and less than or equal to $9 \times C_2$, or each eBRP-AGC sub-field is composed of $3 \times C_2$ or $4 \times C_2$ Gray codes whose lengths are $128 \times C_1$, where when $C_2=1$, $C_1$ is determined by the transmission channel quantity of the first device, or when $C_2$ is determined by the transmission channel quantity of the first device, $C_1=1$. For example, in single channel transmission, when T=9, the eBRP-AGC sub-field is [Ga64 Ga64 Ga64 Ga64 Ga64 Ga64 Ga64 Ga64 Ga64] or [Gb64 Gb64 Gb64 Gb64 Gb64 Gb64 Gb64 Gb64 Gb64], or each eBRP-AGC sub-field may be composed of three or four Gray codes whose lengths are 128. For example, when T=4, the eBRP-AGC sub-field is [Ga128 Ga128 Ga128 Ga128] or [Gb128 Gb128 Gb128 Gb128]. In this way, the eBRP-AGC sub-field can be used to maintain time and frequency synchronization between the transmitter and the receiver. Alternatively, phase tracking is performed using a known sequence in the eBRP-TRN, and a possible implementation is eBRP-TRN length extension. For example, based on an existing TRN sub-field in the IEEE 802.11ad, a Gray code whose length is 128 is added such that [Ga128 −Gb128 Ga128 Gb128 Ga128 −Gb128] is obtained through extension. For example, FIG. 10 is a structural block diagram of another eBRP packet according to an embodiment of the present disclosure. A format of the eBRP packet shown in FIG. 10 is another format, of the eBRP packet, determined according to the method shown in FIG. 7. As shown in FIG. 10, the eBRP packet includes a preamble field, a header field, a data field, and a training field. The preamble field includes an STF field and a CE field, and the training field is composed of an eBRP-AGC sub-field and an eBRP-TRN sub-field. The training field includes eight AGC-TRN sub-field groups, and each AGC-TRN sub-field group includes one eBRP-AGC sub-field and one eBRP-TRN sub-field. In addition, each AGC-TRN sub-field group does not include an eBRP-CE sub-field. In addition, the CE field in the preamble field may be used to measure a common delay on different AWVs. Alternatively, a common delay parameter is not maintained on different AWVs, but a delay parameter on a current AWV is measured in each eBRP-TRN sub-field.

Further, the method shown in FIG. 7 may further include step 703.

Step 703. The first device sends training field configuration information to the second device, where the training field configuration information is used to indicate a format of the training field in the eBRB packet, and the training field configuration information is carried by any one or more of a Beam Refinement Protocol request field, a beam refinement element, or a header field in the eBRP packet.

The header field herein may be a header field defined in the IEEE 802.11ad, or may be a new header field defined in the IEEE 802.11ay.

The training field may be in one or more of the following formats, a structure of the eBRP-AGC sub-field (that is, a quantity and a length of Gray codes that compose each eBRP-AGC sub-field) in the training field and a structure of the eBRP-TRN sub-field (that is, a quantity and a length of Gray codes that compose each eBRP-TRN sub-field) in the training field. Optionally, the format of the training field further includes at least one of the following, a position of the eBRP-AGC sub-field in the training field or a position of the eBRP-TRN sub-field in the training field.

The training field configuration information that is used to indicate the format of the training field in the eBRP packet may directly indicate the format of the training field, or may indicate an index corresponding to the format of the training field i.e., it is preset that the format of the training field corresponds to different indexes. For example, 0 indicates that a format of a BRP packet is used as the format of the training field, and 1 indicates that a format of an eBRP packet is used as the format of the training field. The format of the eBRP packet is a predefined format of the eBRP packet, for example, a proportion of eBRP-CE sub-fields to eBRP-TRN sub-fields is 1:5. A format that is the same as that of a CE sub-field in the IEEE 802.11ad is used for the eBRP-CE sub-field, and a format that is the same as that of a TRN sub-field in the IEEE 802.11ad is used for the eBRP-TRN sub-field. The first device may alternatively indicate the format of the training field to the second device in an implicit indication manner, for example, using other information, such as MIMO, that is, there are a plurality of antennas, or by applying a new channel feedback mode. A transmit side and a receive side agree, in advance, that eBRP packet sending and a new training field that is introduced by a new capability are bonded for using. For example, assuming that a proportion relationship between a CE sub-field and a TRN-T/R needs to be indicated using a new field, it is indicated, by default, that the field is greater than 0, and this indicates that an eBRP packet is sent. Alternatively, when a MIMO capability is supported, an eBRP packet is used by default to implement beam training and tracking. For example, when a quantity of transmit antennas exceeds 1, or a new channel feedback mode is used, it may be considered that measurement is performed based on the eBRP packet.

In addition, the training field configuration information may alternatively be in another form. For example, in the format of the training field, different combinations of a structure of the eBRP-AGC sub-field and a structure of the eBRP-TRN sub-field correspond to different indexes, and an index may be indicated in the training field configuration information to determine the structure of the eBRP-AGC sub-field and the structure of the eBRP-TRN sub-field that are used. In addition, the training field configuration information is further used to indicate a quantity of eBRP-AGC sub-fields and a quantity of eBRP-TRN sub-fields in each AGC-TRN sub-field group in the training field. In this way, the second device may determine the structure of the eBRP-TRN sub-field and the structure of the eBRP-AGC sub-field based on the index, and directly determine the quantity of eBRP-AGC sub-fields and the quantity of eBRP-TRN sub-fields in each AGC-TRN sub-field group in the training field based on the quantity of eBRP-AGC sub-fields and the quantity of eBRP-TRN sub-fields in each AGC-TRN sub-field group in the training field that are indicated.

It can be understood that, in step 703, the first device definitely indicate the format of the training field to the second device in an explicit indication manner. The first device may alternatively indicate the format of the training field to the second device in an implicit indication manner.

In addition, similar to the method shown in FIG. 1, before sending the eBRP packet to the second device, the first device may determine a type of the eBRP packet. A process that the first device sends a corresponding eBRP packet based on the type of the eBRP packet is similar to that in the method shown in FIG. 1. Details do not need to be described herein again.

Further, in the IEEE 802.11ad standard, a training field is sent after being modulated based on π/2 BPSK. In the method shown in FIG. 7, the first device may alternatively use a modulation manner other than the π/2 BPSK. This is not limited in the present disclosure.

It can be understood by a person skilled in the art that, the Gray code, whose length is 128, referred to in this specification means that the Gray code has 128 elements, and each element is one clock cycle (Tc). Time occupied by each field is jointly determined by a quantity of Gray codes in the field and a length of each Gray code. In multi-channel bonding transmission, transmission time of each element is further shortened. Assuming that Z successive channels are bonded, each element is one clock circle (Tc/Z). Tc is a time circle of each element in single channel transmission.

Figure 11:
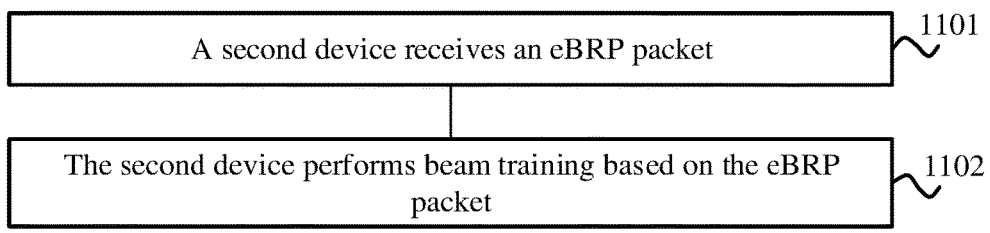
FIG. 11 is a schematic flowchart of a beam refinement method according to an embodiment of the present disclosure.

FIG. 11 is a schematic flowchart of a beam refinement method according to an embodiment of the present disclosure.

Step 1101. A second device receives an eBRP packet, where the eBRP packet includes a training field, the training field includes an eBRP-CE sub-field and an eBRP-TRN sub-field, a ratio of a quantity of Gray codes of the eBRP-CE sub-field in the training field to a quantity of Gray codes of the eBRP-TRN sub-field in the training field is less than 9:20.

The eBRP packet received by the second device in the method shown in FIG. 11 is the same as the eBRP packet determined by the first device in the method shown in FIG. 1. Therefore, similarly, the training field is a suffix after a data field, and in addition to the training field and the data field, the eBRP packet may further include a preamble field and a header field. For descriptions about other fields of the eBRP packet, refer to the embodiment shown in FIG. 1. Details do not need to be described herein again.

Step 1102. The second device performs beam training based on the eBRP.

It can be understood that, in the training field, a quantity of AWVs trained by the first device or the second device is related to a quantity of eBRP-TRN sub-fields but is not related to a quantity of eBRP-CE sub-fields. According to the method shown in FIG. 11, an effective proportion of the eBRP-TRN sub-field in the training field is increased such that more AWV configurations can be attempted within a same period of time.

For formats of the eBRP-CE sub-field, the eBRP-TRN sub-field, and an eBRP-AGC sub-field that are in the eBRP packet, refer to the formats of the eBRP-CE sub-field, the eBRP-TRN sub-field, and the eBRP-AGC sub-field in the embodiment shown in FIG. 1. Details do not need to be described herein again.

Further, the method shown in FIG. 11 may include step 1103 (not shown).

Step 1103. The second device receives training field configuration information sent by the first device, where the training field configuration information is used to indicate a format of the training field in the eBRB packet, and the training field configuration information is carried by any one or more of a Beam Refinement Protocol request field, a beam refinement element, or a header field in the eBRP packet.

The training field configuration information received by the second device in step 1103 is the training field configuration information sent by the first device in the method shown in FIG. 1. Therefore, specific content about the training field configuration information is the same as that in the method shown in FIG. 1. Details do not need to be described herein again.

After receiving the training field configuration information, the second device may determine the format of the training field in the eBRP packet based on the training field configuration information.

Figure 12:
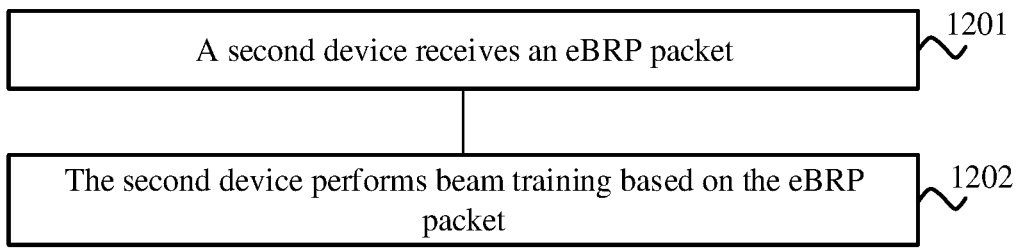
FIG. 12 is a schematic flowchart of another beam refinement method according to an embodiment of the present disclosure.

FIG. 12 is a schematic flowchart of another beam refinement method according to an embodiment of the present disclosure.

Step 1201. A second device receives an eBRP packet sent by a first device, where the eBRP packet includes a training field, and the training field is composed of an eBRP-AGC field and an eBPR-TRN sub-field.

Step 1202. The second device determines, based on the eBRP packet, a beam that needs to be used.

According to the method shown in FIG. 12, the training field does not include a CE sub-field in the IEEE 802.11ad or an eBRP-CE sub-field that is defined above such that an effective proportion of the eBRP-TRN sub-field in the training field is increased, and more AWV configurations can be attempted within a same period of time.

For formats of an eBRP-CE sub-field, an eBRP-TRN sub-field, and an eBRP-AGC sub-field that are in the eBRP packet, refer to the formats of the eBRP-CE sub-field, the eBRP-TRN sub-field, and the eBRP-AGC sub-field in the embodiment shown in FIG. 7. Details do not need to be described herein again.

In addition, the second device may further use a CE field in a preamble field in the eBRP packet, to measure a common delay on different AWVs. Alternatively, the second device may not maintain a common delay parameter on different AWVs, but measures a delay parameter on a current AWV in each eBRP-TRN sub-field. Further, transmission may be performed with reference to a multi-channel bonding technology. Details are not described herein again.

Further, the method shown in FIG. 12 may include step 1203 (not shown).

Step 1203. The second device receives training field configuration information sent by the first device, where the training field configuration information is used to indicate a format of the training field in the eBRB packet, and the training field configuration information is carried by any one or more of a Beam Refinement Protocol request field, a beam refinement element, or a header field in the eBRP packet.

The training field configuration information received by the second device in step 1203 is the training field configuration information sent by the first device in the method shown in FIG. 7. Therefore, specific content about the training field configuration information is the same as that in the method shown in FIG. 7. Details do not need to be described herein again.

Figure 13:
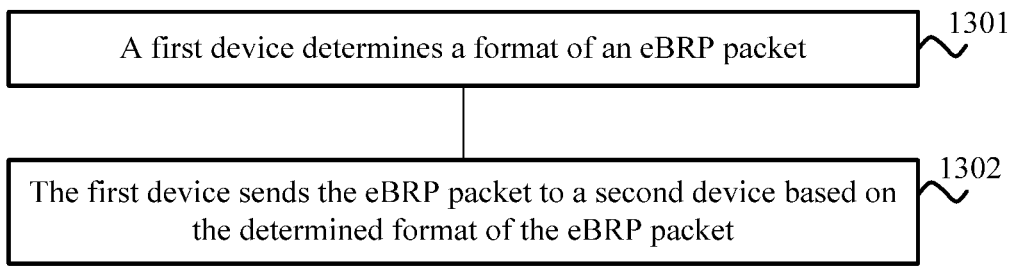
FIG. 13 is a schematic flowchart of another beam refinement method according to an embodiment of the present disclosure.

FIG. 13 is a schematic flowchart of another beam refinement method according to an embodiment of the present disclosure.

Step 1301. A first device determines a format of an eBRP packet, where the eBRP packet includes a training field, and the training field includes an eBRP-AGC field, and the determining, by a first device, a format of an eBRP packet includes determining, by the first device, that the training field includes K beam refinement AGC-TRN sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1.

Step 1302. The first device sends the eBRP packet to a second device based on the determined format of the eBRP packet.

According to the method shown in FIG. 13, a receiver may estimate a suitable receiver gain at each AGC-TRN sub-field group, and therefore a larger receiver dynamic range can be received. This helps to measure channel information in different AWV configurations. In addition, when the quantity K is the same as a quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

In the method shown in FIG. 13, in the eBRP packet, formats of specific fields, such as the eBRP-AGC sub-field, the eBRP-TRN sub-field, and an eBRP-CE sub-field, may be designed based on a length and a sequence structure of a field in the IEEE 802.11ad, or may be designed with reference to the method shown in FIG. 1 or FIG. 7 in the present disclosure. Details do not need to be described herein again.

The AGC-TRN sub-field group is a sub-field group including an eBRP-AGC sub-field and an eBRP-TRN sub-field.

Further, the K AGC-TRN sub-field groups may have a plurality of function cases. For example, quantities of eBRP-AGC sub-fields included in any two of the K AGC-TRN sub-field groups are the same. For another example, quantities of eBRP-AGC sub-fields included in any two of the K AGC-TRN sub-field groups are different. For another example, there are at least two types of AGC-TRN sub-field groups in the K AGC-TRN sub-field groups, and each type of AGC-TRN sub-field group may include one or more AGC-TRN sub-field groups. AGC-TRN sub-field groups that include a same quantity of eBRP-AGC sub-fields belong to a same type of AGC-TRN sub-field group. Quantities of eBRP-AGC sub-fields included in AGC-TRN sub-field groups of different types of AGC-TRN sub-field groups are different. For example, assuming that there are three AGC-TRN sub-field groups, a first AGC-TRN sub-field group includes four eBRP-AGC sub-fields and four eBRP-TRN sub-fields, a second AGC-TRN sub-field group includes eight eBRP-AGC sub-fields and eight eBRP-TRN sub-fields, and a third AGC-TRN sub-field group includes four eBRP-AGC sub-fields and four eBRP-TRN sub-fields. It can be learned that, a quantity of eBRP-AGC sub-fields included in the first AGC-TRN sub-field group is different from a quantity of eBRP-AGC sub-fields included in the second AGC-TRN sub-field group, and the quantity of eBRP-AGC sub-fields included in the second AGC-TRN sub-field group is different from a quantity of eBRP-AGC sub-fields included in the third AGC-TRN sub-field group. It can be understood that, a quantity of eBRP-AGC sub-fields and a quantity of eBRP-TRN sub-fields that are included in a same AGC-TRN sub-field group are the same. Therefore, if quantities of eBRP-AGC sub-fields included in two AGC-TRN sub-field groups are different, quantities of eBRP-TRN sub-fields included in the two AGC-TRN sub-field groups are also different, and if quantities of eBRP-AGC sub-fields included in two AGC-TRN sub-field groups are the same, quantities of eBRP-TRN sub-fields included in the two AGC-TRN sub-field groups are also the same.

In addition, the first device may further send training field configuration information to the second device. A specific implementation in which the first device sends the training field configuration information to the second device is the same as the specific implementations in the method shown in FIG. 1 and the method shown in FIG. 7. Details do not need to be described herein again.

Figure 14:
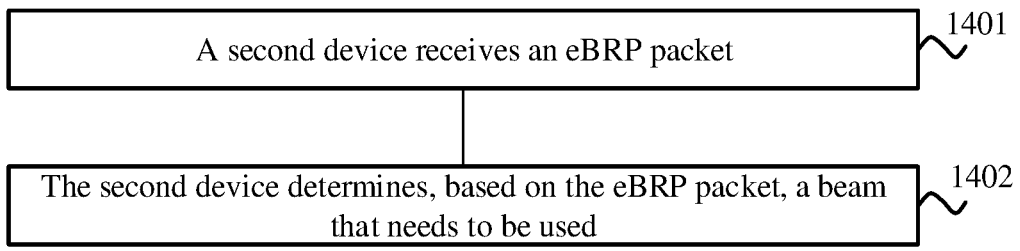
FIG. 14 is a schematic flowchart of another beam refinement method according to an embodiment of the present disclosure.

FIG. 14 is a schematic flowchart of another beam refinement method according to an embodiment of the present disclosure.

Step 1401. A second device receives an eBRP packet sent by a first device, where the eBRP packet includes a training field, the training field includes an eBRP-AGC field, and the training field includes K beam refinement AGC-TRN sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1.

Step 1402. The second device determines, based on the eBRP packet, a beam that needs to be used.

According to the method shown in FIG. 14, a receiver may estimate a suitable receiver gain at each AGC-TRN sub-field group, and therefore a larger receiver dynamic range can be received. This helps to measure channel information in different AWV configurations. In addition, when the quantity K is the same as a quantity of eBRP-TRN sub-fields, each eBRP-AGC sub-field is adjacent to an eBRP-TRN sub-field, thereby reducing AWV changing times. Reduction in the AWV changing times is accompanied with reduction in time that cannot be used for measurement in an AWV configuration. Therefore, more time may be available for determining magnitudes and phases corresponding to different AWV configurations, thereby helping to determine a refined beam.

In the method shown in FIG. 14, for setting of other fields in the eBRP packet, such as the eBRP-TRN sub-field and an eBRP-CE sub-field, reference may be made to the method shown in FIG. 1 or FIG. 7. Details do not need to be described herein again.

Further, the K AGC-TRN sub-field groups may have a plurality of function cases. Specific cases are the same as those in the method shown in FIG. 13. Details do not need to be described herein again.

Further, the second device receives training field configuration information sent by the first device. A specific implementation in which the second device receives the training field configuration information sent by the first device is the same as the specific implementations in the method shown in FIG. 11 and the method shown in FIG. 12. Details do not need to be described herein again.

Figure 15:
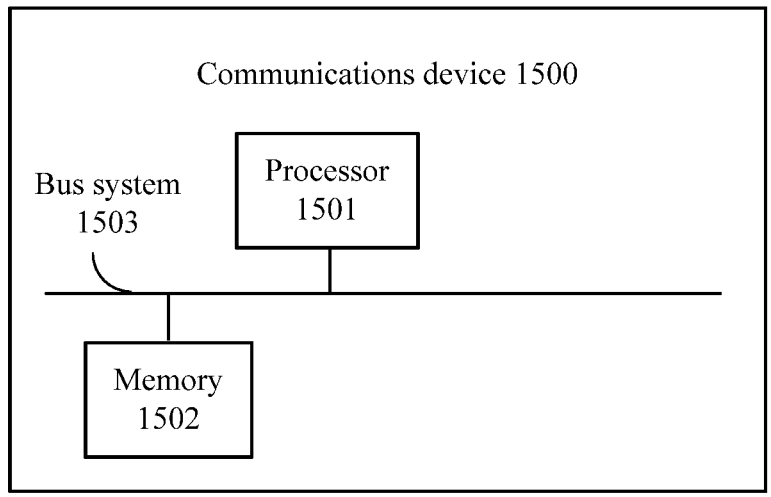
FIG. 15 is a structural block diagram of a communications device according to an embodiment of the present disclosure.

FIG. 15 is a structural block diagram of a communications device 1500 according to an embodiment of the present disclosure. The communications device 1500 shown in FIG. 15 is capable of performing steps performed by the first device in the method shown in FIG. 1. The communications device 1500 shown in FIG. 15 includes a processor 1501 and a memory 1502.

Components of the communications device 1500 are coupled together using a bus system 1503. In addition to a data bus, the bus system 1503 further includes a power bus, a control bus, and a status signal bus. However, for clear description, various buses in FIG. 15 are all marked as a bus system 1503.

The method disclosed in the embodiments of the present disclosure is applicable to the processor 1501, or implemented by the processor 1501. The processor 1501 may be an integrated circuit chip with a signal processing capability. During implementation, the steps of the foregoing methods may be implemented using an integrated logic circuit of hardware in the processor 1501, or using a software instruction. The foregoing processor 1501 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1501 may implement or perform methods, steps, and logical block diagrams disclosed in the embodiments of the present disclosure. The general purpose processor may be a microprocessor, or the processor 1501 may be any conventional processor, or the like. The steps of the methods disclosed with reference to the embodiments of the present disclosure may be directly implemented by a hardware decoding processor, or may be implemented by a combination of hardware in a decoding processor and a software module. The software module may be located in a storage medium that is mature in the art, such as a random access memory (RAM), a flash memory, a read-only memory (ROM), a programmable ROM (PROM), an electrically erasable PROM (EEPROM), or a register. The storage medium is located in the memory 1502. The processor 1501 reads an instruction in the memory 1502 and completes the steps of the foregoing method in combination with hardware of the processor 1501.

The processor 1501 executes the following instruction that is stored in the memory 1502 and that includes the following operations of determining a format of an eBRP packet, where the eBRP packet includes a training field, the training field includes an eBRP-CE sub-field and an eBRP-TRN sub-field, and a ratio of a quantity of Gray codes that compose the eBRP-CE sub-field in the training field to a quantity of Gray codes that compose the eBRP-TRN sub-field in the training field is less than 9:20, and sending the eBRP packet to a second device based on the determined format of the eBRP packet.

It can be understood that the communications device 1500 may include an antenna, and the eBRP packet is sent to the second device using the antenna.

Figure 16:
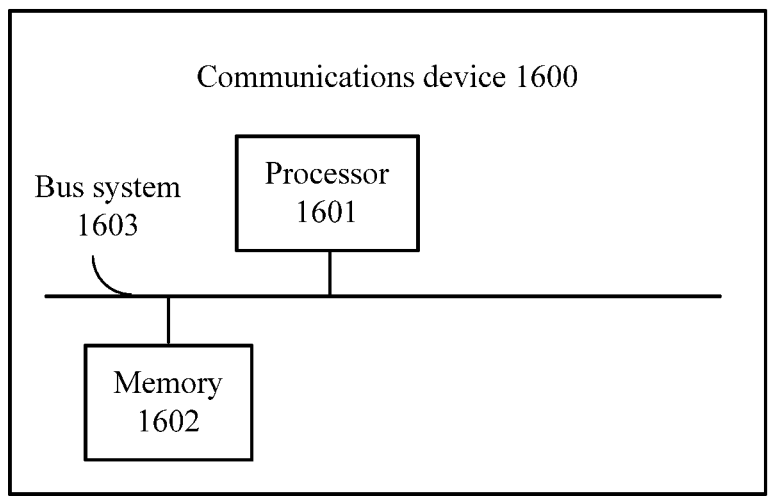
FIG. 16 is a structural block diagram of a communications device according to an embodiment of the present disclosure.

FIG. 16 is a structural block diagram of a communications device 1600 according to an embodiment of the present disclosure. The communications device 1600 shown in FIG. 16 is capable of performing steps performed by the first device in the method shown in FIG. 7. The communications device 1600 shown in FIG. 16 includes a processor 1601 and a memory 1602.

Components of the communications device 1600 are coupled together using a bus system 1603. In addition to a data bus, the bus system 1603 further includes a power bus, a control bus, and a status signal bus. However, for clear description, various buses in FIG. 16 are all marked as a bus system 1603.

The method disclosed in the embodiments of the present disclosure is applicable to the processor 1601, or implemented by the processor 1601. The processor 1601 may be an integrated circuit chip with a signal processing capability. During implementation, the steps of the foregoing methods may be implemented using an integrated logic circuit of hardware in the processor 1601, or using a software instruction. The foregoing processor 1601 may be a general purpose processor, a DSP, an ASIC, an FPGA or another programmable logic device, a discrete gate or transistor logic device, or a discrete hardware component. The processor 1601 may implement or perform methods, steps, and logical block diagrams disclosed in the embodiments of the present disclosure. The general purpose processor may be a microprocessor, or the processor may be any conventional processor, or the like. The steps of the methods disclosed with reference to the embodiments of the present disclosure may be directly implemented by a hardware decoding processor, or may be implemented by a combination of hardware in a decoding processor and a software module. The software module may be located in a storage medium that is mature in the art, such as a RAM, a flash memory, a ROM, a PROM, an EEPROM, or a register. The storage medium is located in the memory 1602. The processor 1601 reads an instruction in the memory 1602 and completes the steps of the foregoing method in combination with hardware of the processor 1601.

The processor 1601 executes the following instruction that is stored in the memory 1602 and that includes the following operations of determining a format of an eBRP packet, where the eBRP packet includes a training field, and the training field is composed of an eBRP-AGC field and an eBRP-TRN sub-field, and sending the eBRP packet to a second device based on the determined format of the eBRP packet.

It can be understood that the communications device 1600 may include an antenna, and the eBRP packet is sent to the second device using the antenna.

Figure 17:
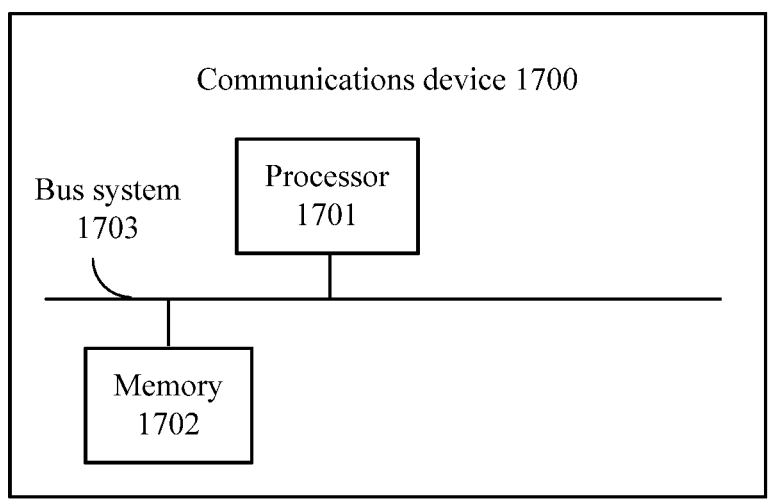
FIG. 17 is a structural block diagram of a communications device according to an embodiment of the present disclosure.

FIG. 17 is a structural block diagram of a communications device 1700 according to an embodiment of the present disclosure. The communications device 1700 shown in FIG. 17 is capable of performing steps performed by the first device in the method shown in FIG. 13. The communications device 1700 shown in FIG. 17 includes a processor 1701 and a memory 1702.

Components of the communications device 1700 are coupled together using a bus system 1703. In addition to a data bus, the bus system 1703 further includes a power bus, a control bus, and a status signal bus. However, for clear description, various buses in FIG. 17 are all marked as a bus system 1703.

The method disclosed in the embodiments of the present disclosure is applicable to the processor 1701, or implemented by the processor 1701. The processor 1701 may be an integrated circuit chip with a signal processing capability. During implementation, the steps of the foregoing methods may be implemented using an integrated logic circuit of hardware in the processor 1701, or using a software instruction. The foregoing processor 1701 may be a general purpose processor, a DSP, an ASIC, an FPGA or another programmable logic device, a discrete gate or transistor logic device, or a discrete hardware component. The processor 1701 may implement or perform methods, steps, and logical block diagrams disclosed in the embodiments of the present disclosure. The general purpose processor may be a microprocessor, or the processor may be any conventional processor, or the like. The steps of the methods disclosed with reference to the embodiments of the present disclosure may be directly implemented by a hardware decoding processor, or may be implemented by a combination of hardware in a decoding processor and a software module. The software module may be located in a storage medium that is mature in the art, such as a RAM, a flash memory, a ROM, a PROM, an EEPROM, or a register. The storage medium is located in the memory 1702. The processor 1701 reads an instruction in the memory 1702 and completes the steps of the foregoing method in combination with hardware of the processor 1701.

The processor 1701 executes the following instruction that is stored in the memory 1702 and that includes the following operations of determining a format of an eBRP packet, where the eBRP packet includes a training field, and the training field includes an eBRP-AGC field, and determining, by the first device, a format of an eBRP packet includes determining, by the first device, that the training field includes K beam refinement AGC-TRN sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1, and sending the eBRP packet to a second device based on the determined format of the eBRP packet.

It can be understood that the communications device 1700 may include an antenna, and the eBRP packet is sent to the second device using the antenna.

An embodiment of the present disclosure further provides a communications device, and the communications device is capable of performing steps of the method shown in FIG. 1. The communications device includes a determining unit and a communications unit. The determining unit is configured to determine a format of an eBRP packet, where the eBRP packet includes a training field, the training field includes an eBRP-CE sub-field and an eBRP-TRN sub-field, and a ratio of a quantity of Gray codes that compose the eBRP-CE sub-field in the training field to a quantity of Gray codes that compose the eBRP-TRN sub-field in the training field is less than 9:20. The communications unit is configured to send the eBRP packet to a second device based on the determined format of the eBRP packet.

An embodiment of the present disclosure further provides a communications device, and the communications device is capable of performing steps of the method shown in FIG. 7. The communications device includes a determining unit and a communications unit. The determining unit is configured to determine a format of an eBRP packet, where the eBRP packet includes a training field, the training field is composed of an eBRP-AGC field and an eBRP beam refinement training eBRP-TRN sub-field. The communications unit is configured to send the eBRP packet to a second device based on the determined format of the eBRP packet.

An embodiment of the present disclosure further provides a communications device. The communications device includes a determining unit and a communications unit. The determining unit is configured to determine a format of an eBRP packet, where the eBRP packet includes a training field, the training field includes an eBRP-CE sub-field and an eBRP-TRN sub-field, and determining a format of an eBRP packet includes, when an antenna quantity of the communications device exceeds 1, determining that there is at least one pair of Gray code complementary sequences in each codeword of an orthogonal mask of the eBRP-CE sub-field and the eBRP-TRN sub-field. The communications unit is configured to send the eBRP packet to a second device based on the determined format of the eBRP packet.

An embodiment of the present disclosure further provides a communications device. The communications device is capable of performing steps of the method shown in FIG. 13. The communications device includes a determining unit and a communications unit. The determining unit is configured to determine a format of an eBRP packet, where the eBRP packet includes a training field, the training field includes an eBRP-AGC field, and determining a format of an eBRP packet includes determining that the training field includes K beam refinement AGC-TRN sub-field groups, where quantities of eBRP-AGC sub-fields and eBRP beam refinement training eBRP-TRN sub-fields included in each AGC-TRN sub-field group are the same, the eBRP-AGC sub-fields and the eBRP-TRN sub-fields in each AGC-TRN sub-field group use a same AWV group, the eBRP-AGC sub-fields are located prior to the eBRP-TRN sub-fields in each AGC-TRN sub-field group, and K is a positive integer greater than 1. The communications unit is configured to send the eBRP packet to a second device based on the determined format of the eBRP packet.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatuses, and methods may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not be performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the present disclosure essentially, or the part contributing to the other approaches, or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A beam refinement method, comprising:
   determining, by a first device, a format of an enhanced Beam Refinement Protocol (eBRP) packet, wherein the eBRP packet comprises a data field and a training field suffixed after the data field, and wherein the training field comprises an eBRP channel estimation (eBRP-CE) sub-field and an eBRP training (eBRP-TRN) sub-field;
   determining, by the first device based on a modulation and coding scheme level of the data field, a ratio of a quantity of Gray codes composing the eBRP-CE sub-field in the training field to a quantity of Gray codes composing the eBRP-TRN sub-field in the training field, wherein the ratio of the quantity of Gray codes composing the eBRP-CE sub-field in the training field to the quantity of Gray codes composing the eBRP-TRN sub-field in the training field is less than 9:20; and
   sending, by the first device, the eBRP packet to a second device based on the determined format of the eBRP packet.

2. The method of claim 1, wherein determining the format of the eBRP packet comprises determining, by the first device, that a ratio of a quantity of eBRP-CE sub-fields in the training field to a quantity of eBRP-TRN sub-fields in the training field is less than or equal to 1:4, and wherein a ratio of a quantity of Gray codes composing each eBRP-CE sub-field in the training field to a quantity of Gray codes composing each eBRP-TRN sub-field in the training field is less than 9:5 when the ratio of the quantity of eBRP-CE sub-fields in the training field to the quantity of eBRP-TRN sub-fields in the training field is equal to 1:4.

3. The method of claim 2, wherein determining the format of the eBRP packet comprises determining, by the first device, that a length of each Gray code in each eBRP-CE sub-field and each eBRP-TRN sub-field in the training field is $128 \times C1$, the $C_1$ being determined by a transmission channel quantity of the first device.

4. The method of claim 2, wherein a ratio of a quantity of Gray codes composing each eBRP-CE sub-field in the training field to a quantity of Gray codes composing each eBRP-TRN sub-field in the training field is less than 9:5 when the ratio of the quantity of eBRP-CE sub-fields in the training field to the quantity of eBRP-TRN sub-fields in the training field is equal to 1:4.

5. The method of claim 1, wherein determining the format of the eBRP packet comprises at least one of the following three options:
   determining, by the first device, a transmission channel quantity (C), and determining that each eBRP-CE sub-field in the training field is composed of $C \times S$ Gray codes, wherein the S is a positive integer less than nine, and wherein the C is determined by a transmission channel quantity of the first device;
   determining, by the first device, the C, and determining that the eBRP-CE sub-field in the training field comprises a first eBRP-CE sub-field and a second eBRP-CE sub-field, wherein each first eBRP-CE sub-field is composed of $C \times S$ Gray codes, wherein each second eBRP-CE sub-field is composed of nine Gray codes, and wherein C is a positive integer greater than or equal to one; or
   determining, by the first device, the C, and determining that each eBRP-CE sub-field in the training field is composed of $C \times 9$ Gray codes, and determining, by the first device, that a quantity of eBRP-CE sub-fields in the training field (N), a quantity of eBRP-TRN sub-fields in the training field (M), and the quantity of Gray codes composing each eBRP-TRN sub-field in the training field (Y) meet a formula $9 \times C \times N : Y \times M < 9:20$.

6. The method of claim 1, wherein determining the format of the eBRP packet comprises:
   determining, by the first device, a transmission channel quantity (C); and
   determining, by the first device, that each eBRP-TRN sub-field in the training field is composed of $C \times Y$ Gray codes, wherein the Y is a positive integer greater than or equal to five, wherein the C is a positive integer greater than or equal to one, and wherein when Y is five, a quantity of eBRP-CE sub-fields in the training field (N), a quantity Gray codes composing each eBRP-CE sub-field in the training field (X), and a quantity of eBRP-TRN sub-fields in the training field (M) meet a formula $X \times N : 5 \times C \times M < 9:20$.

7. The method of claim 1, wherein determining the format of the eBRP packet comprises determining, by the first device, that there is at least one pair of Gray code complementary sequences in each codeword of an orthogonal mask of the eBRP-CE sub-field and the eBRP-TRN sub-field when an antenna quantity of the first device exceeds one.

8. The method of claim 7, wherein determining the format of the eBRP packet comprises determining, by the first device based on the antenna quantity of the first device and an antenna polarization direction of the first device, the quantity of Gray codes in each eBRP-CE sub-field in the training field and the quantity of Gray codes in each eBRP-TRN sub-field in the training field.

9. The method of claim 8, wherein determining the quantity of Gray codes in each eBRP-CE sub-field in the training field and the quantity of Gray codes in each eBRP-TRN sub-field in the training field comprises:
determining, by the first device, that each eBRP-CE sub-field in the training field is composed of $5 \times C_2$ Gray codes;
determining, by the first device, that each eBRP-TRN sub-field in the training field is composed of five Gray codes when the antenna quantity of the first device is one or two and an antenna of the first device is a co-polarized antenna;
determining, by the first device, that each eBRP-CE sub-field in the training field is composed of $9 \times C_2$ Gray codes;
determining, by the first device, that each eBRP-TRN sub-field in the training field is composed of $10 \times C_2$ Gray codes or $9 \times C_2$ Gray codes when the antenna quantity of the first device is three or four and the antenna of the first device is the co-polarized antenna;
determining, by the first device, that each eBRP-CE sub-field in the training field is composed of $5 \times C_2$ Gray codes; and
determining, by the first device, that each eBRP-TRN sub-field in the training field is composed of $5 \times C_2$ Gray codes when the antenna quantity of the first device is two or four and the antenna of the first device is a cross-polarized antenna, wherein either the $C_2=1$ or $C_2$ is determined by a transmission channel quantity of the first device.

10. The method of claim 1, further comprising sending, by the first device, training field configuration information to the second device, wherein the training field configuration information indicates a format of the training field in the eBRP packet, and wherein the training field configuration information is carried by at least one of a Beam Refinement Protocol request field, a beam refinement element, or a header field in the enhanced Beam Refinement Protocol packet.

11. A communications device, comprising:
a computer readable storage medium storing computer instructions; and
a processor coupled to the computer readable storage medium to retrieve and execute the computer instructions to cause the communications device to:
determine a format of an enhanced Beam Refinement Protocol (eBRP) packet, wherein the eBRP packet comprises a data field and a training field suffixed after the data field, and wherein the training field comprises an eBRP channel estimation (eBRP-CE) sub-field and an eBRP training (eBRP-TRN) sub-field;
determine, based on a modulation and coding scheme level of the data field, a ratio of a quantity of Gray codes composing the eBRP-CE sub-field in the training field to a quantity of Gray codes composing the eBRP-TRN sub-field in the training field, wherein the ratio of the quantity of Gray codes composing the eBRP-CE sub-field in the training field to the quantity of Gray codes composing the eBRP-TRN sub-field in the training field is less than 9:20; and
send the eBRP packet to a second device based on the determined format of the eBRP packet.

12. The communications device of claim 11, wherein in a manner of determining the format of the eBRP packet, the instructions further cause the communications device to be configured to determine that a ratio of a quantity of eBRP-CE sub-fields in the training field to a quantity of eBRP-TRN sub-fields in the training field is less than or equal to 1:4, and wherein a ratio of a quantity of Gray codes composing each eBRP-CE sub-field in the training field to a quantity of Gray codes composing each eBRP-TRN sub-field in the training field is less than 9:5 when the ratio of the quantity of eBRP-CE sub-fields in the training field to the quantity of eBRP-TRN sub-fields in the training field is equal to 1:4.

13. The communications device of claim 12, wherein in a manner of determining the format of the eBRP packet, the instructions further cause the communications device to be configured to determine that a length of each Gray code in each eBRP-CE sub-field and each eBRP-TRN sub-field in the training field is $128 \times C_1$, the $C_1$ being determined by a transmission channel quantity of the communications device.

14. The communications device of claim 12, wherein a ratio of a quantity of Gray codes composing each eBRP-CE sub-field in the training field to a quantity of Gray codes composing each eBRP-TRN sub-field in the training field is less than 9:5 when the ratio of the quantity of eBRP-CE sub-fields in the training field to the quantity of eBRP-TRN sub-fields in the training field is equal to 1:4.

15. The communications device of claim 11, wherein in a manner of determining the format of the eBRP packet, the instructions further cause the-communications device to be configured to perform at least one of the following three steps:
determine a transmission channel quantity (C), and determine that each eBRP-CE sub-field in the training field is composed of $C \times S$ Gray codes, wherein the S is a positive integer less than nine, and wherein the C is determined by a transmission channel quantity of the communications device;
determine the C, and determine that the eBRP-CE sub-field in the training field comprises a first eBRP-CE sub-field and a second eBRP-CE sub-field, wherein each first eBRP-CE sub-field is composed of $C \times S$ Gray codes, wherein each second eBRP-CE sub-field is composed of nine Gray codes, and wherein C is a positive integer greater than or equal to one; or
determine the C, and determine that each eBRP-CE sub-field in the training field is composed of $C \times 9$ Gray codes, and determine that a quantity of eBRP-CE sub-fields in the training field (N), a quantity of eBRP-TRN sub-fields in the training field (M), and the quantity of Gray codes composing each eBRP-TRN sub-field in the training field (Y) meet a formula $9 \times C \times N : Y \times M < 9 : 20$.

16. The communications device of claim 11, wherein in a manner of determining the format of the eBRP packet, the instructions further cause the communications device to:
determine a transmission channel quantity (C); and
determine that each eBRP-TRN sub-field in the training field is composed of $C \times Y$ Gray codes, wherein the Y is a positive integer greater than or equal to five, wherein the C is a positive integer greater than or equal to one, and wherein when Y is five, a quantity of eBRP-CE sub-fields in the training field (N), a quantity of Gray codes composing each eBRP-CE sub-field in the training field (X), and a quantity of eBRP-TRN sub-fields in the training field (M) meet a formula X×N:5×C×M<9: 20.

17. The communications device of claim 11, wherein in a manner of determining the format of the eBRP packet, the instructions further cause the communications device to be configured to determine that there is at least one pair of Gray code complementary sequences in each codeword of an orthogonal mask of the eBRP-CE sub-field and the eBRP-TRN sub-field when an antenna quantity of the communications device exceeds one.

18. The communications device of claim 17, wherein in a manner of determining the format of the eBRP packet, the instructions further cause the communications device to be configured to determine, based on the antenna quantity of the communications device and an antenna polarization direction of the communications device, the quantity of Gray codes in each eBRP-CE sub-field in the training field and the quantity of Gray codes in each eBRP-TRN sub-field in the training field.

19. The communications device of claim 18, wherein in a manner of determining the quantity of Gray codes in each eBRP-CE sub-field in the training field and the quantity of Gray codes in each eBRP-TRN sub-field in the training field, the instructions further cause the communications device to be configured to:
 determine that each eBRP-CE sub-field in the training field is composed of 5×$C_2$ Gray codes;
 determine that each eBRP-TRN sub-field in the training field is composed of five Gray codes when the antenna quantity of the communications device is one or two and an antenna of the communications device is a co-polarized antenna;
 determine that each eBRP-CE sub-field in the training field is composed of 9×$C_2$ Gray codes;
 determine that each eBRP-TRN sub-field in the training field is composed of 10×$C_2$ Gray codes or 9×$C_2$ Gray codes when the antenna quantity of the communications device is three or four and the antenna of the communications device is the co-polarized antenna;
 determine that each eBRP-CE sub-field in the training field is composed of 5×$C_2$ Gray codes; and
 determine each eBRP-TRN sub-field in the training field is composed of 5×$C_2$ Gray codes when the antenna quantity of the communications device is two or four and the antenna of the communications device is a cross-polarized antenna, wherein either the $C_2$=1 or $C_2$ is determined by a transmission channel quantity of the communications device.

20. The communications device of claim 11, wherein the instructions further cause the communications device to be configured to send training field configuration information to the second device, wherein the training field configuration information indicates a format of the training field in the eBRP packet, and wherein the training field configuration information is carried by at least one of a Beam Refinement Protocol request field, a beam refinement element, or a header field in the enhanced Beam Refinement Protocol packet.

* * * * *